(12) United States Patent
Russell et al.

(10) Patent No.: US 10,745,237 B2
(45) Date of Patent: Aug. 18, 2020

(54) HYDRAULIC TRUCK BED REEL LIFT APPARATUS

(71) Applicant: Triple C. Manufacturing, Inc., Sabetha, KS (US)

(72) Inventors: Jay R. Russell, Sabetha, KS (US); Edwin J. Strathman, Bern, KS (US); Galen R. Ackerman, Sabetha, KS (US)

(73) Assignee: Triple C Manufacturing, Inc., Sabetha, KS (US)

( * ) Notice: Subject to any disclaimer, the term of this patent is extended or adjusted under 35 U.S.C. 154(b) by 243 days.

(21) Appl. No.: 15/939,498

(22) Filed: Mar. 29, 2018

(65) Prior Publication Data
US 2018/0282108 A1 Oct. 4, 2018

Related U.S. Application Data

(60) Provisional application No. 62/478,666, filed on Mar. 30, 2017, provisional application No. 62/573,223, filed on Oct. 17, 2017.

(51) Int. Cl.
*B65H 75/42* (2006.01)
*B60P 3/03* (2006.01)
(Continued)

(52) U.S. Cl.
CPC .............. *B65H 75/425* (2013.01); *B60P 1/48* (2013.01); *B65H 75/24* (2013.01);
(Continued)

(58) Field of Classification Search
CPC .. B65H 75/425; B65H 75/24; B65H 75/4457; B65H 75/4481; B65H 75/4486;
(Continued)

(56) References Cited

U.S. PATENT DOCUMENTS

| | | |
|---|---|---|
| 3,082,891 A | 3/1963 | Hessler et al. |
| 3,325,118 A | 6/1967 | Hall |

(Continued)

FOREIGN PATENT DOCUMENTS

| | | |
|---|---|---|
| CA | 2226913 A1 | 3/1999 |
| FR | 2744711 A1 | 8/1997 |

(Continued)

OTHER PUBLICATIONS

Machine translation of JP4190018 Ichinohe Takatomo, Dec. 3, 2008.

(Continued)

*Primary Examiner* — Michael E Gallion
(74) *Attorney, Agent, or Firm* — Daniel Coughlin; Coughlin Law Office LLC

(57) ABSTRACT

A vehicle-mounted reel lifting apparatus for rotating the reel to dispense or wind the reelable material. A driven wheel engages the rim of the reel at a plurality of reel lifting arm pivot positions, such as sliding alongside the lifting arm in an axis parallel with the lifting arm. The driven wheel is capable of engaging with the reel at any position of the lifting arm. A linear drive mechanism allows the driven wheel to travel up and down the lifting arm to accommodate various reel sizes. The lifting arm may incorporate an automatic locking slot having a spring-driven locking mechanism. The lifting arms may also be mounted with a mounting bracket having a pattern of slots to enable the lifting arms to be selectively mounted in a narrow configuration or a wide configuration.

16 Claims, 18 Drawing Sheets

(51) Int. Cl.
*B60P 1/48* (2006.01)
*B65H 75/44* (2006.01)
*B65H 75/24* (2006.01)
*B66C 1/62* (2006.01)
*B66D 1/14* (2006.01)
*B66D 1/20* (2006.01)
*B66D 1/28* (2006.01)
*B60P 3/035* (2006.01)

(52) U.S. Cl.
CPC ..... *B65H 75/4457* (2013.01); *B65H 75/4481* (2013.01); *B65H 75/4486* (2013.01); *B66C 1/62* (2013.01); *B66D 1/14* (2013.01); *B66D 1/20* (2013.01); *B66D 1/28* (2013.01); *B60P 3/035* (2013.01); *B66C 2700/0357* (2013.01)

(58) Field of Classification Search
CPC ...... B65H 49/34; B65H 49/24; B65H 49/325; B65H 49/32; B65H 49/321; B65H 49/36; B65H 49/74; B60P 1/48; B60P 3/035; B66C 1/62; B66C 2700/0357; B66D 1/14; B66D 1/20; B66D 1/28
See application file for complete search history.

(56) References Cited

U.S. PATENT DOCUMENTS

| | | | |
|---|---|---|---|
| 3,625,380 A | 12/1971 | Anderson | |
| 3,820,673 A | 6/1974 | Mc | |
| 4,085,904 A * | 4/1978 | McElroy | B65H 49/34 242/564 |
| 4,091,946 A | 5/1978 | Kraeft et al. | |
| 4,155,518 A | 5/1979 | Small | |
| 4,176,801 A * | 12/1979 | Douglas | B65H 49/24 242/118.4 |
| 4,354,793 A | 10/1982 | Perry | |
| 4,385,862 A | 5/1983 | McVaugh | |
| 4,454,999 A * | 6/1984 | Woodruff | B65H 49/34 242/388.7 |
| 4,511,304 A | 4/1985 | Woodruff | |
| 4,542,861 A | 9/1985 | Barnes | |
| 4,591,309 A | 5/1986 | Clapp | |
| 4,594,041 A | 6/1986 | Hostetler | |
| 4,762,291 A * | 8/1988 | Sauber | B60P 3/035 242/559 |
| 4,767,073 A * | 8/1988 | Malzacher | B65H 54/2812 242/397.3 |
| 5,332,166 A * | 7/1994 | Kepes | B65H 54/42 242/390.2 |
| 5,366,171 A | 11/1994 | Kononov | |
| 5,509,770 A | 4/1996 | Burenga | |
| 5,584,637 A | 12/1996 | Jensen | |
| 5,673,869 A | 10/1997 | Honegger | |
| 5,842,662 A * | 12/1998 | Crossman | A01K 89/003 242/422.4 |
| 6,347,761 B1 * | 2/2002 | Larson | B65H 49/32 242/390.5 |
| 6,467,715 B2 | 10/2002 | Go | |
| 6,817,820 B2 * | 11/2004 | Ackerman | B60P 1/483 198/468.2 |
| 6,932,294 B1 | 8/2005 | Larson | |
| 7,153,082 B2 | 12/2006 | Nolasco | |
| 7,494,087 B2 | 2/2009 | McVaugh | |
| 7,695,236 B2 | 4/2010 | Green | |
| 8,021,097 B2 | 9/2011 | McVaugh | |
| 8,534,981 B1 | 9/2013 | Bortz | |
| 10,301,149 B2 * | 5/2019 | Franklin-Hensler | B65H 75/4481 |
| 2008/0121749 A1 * | 5/2008 | McVaugh | B60P 3/035 242/399.1 |
| 2009/0097951 A1 | 4/2009 | McVaugh | |
| 2009/0196723 A1 * | 8/2009 | Smith | B60P 3/035 414/546 |
| 2012/0061504 A1 * | 3/2012 | Powell | B65H 49/34 242/564 |
| 2015/0158692 A1 * | 6/2015 | Reynolds | B65H 75/425 242/390.2 |
| 2015/0291076 A1 * | 10/2015 | Keast | B60P 3/035 242/557 |
| 2015/0292282 A1 * | 10/2015 | Dyck | E21B 19/008 166/385 |
| 2016/0194178 A1 * | 7/2016 | Braack | B65H 75/425 242/388.8 |
| 2018/0015865 A1 * | 1/2018 | Varonier | B60P 3/035 |
| 2018/0170706 A1 * | 6/2018 | Grabowski | B65H 49/321 |

FOREIGN PATENT DOCUMENTS

| | | |
|---|---|---|
| GB | 2367280 A | 4/2002 |
| JP | 4190018 B2 | 12/2008 |

OTHER PUBLICATIONS

Deweze "R/T Bed Reel Transport by Deweze" Product Information Webpage.
Deweze "Reel Transport Flyer".
FS3 Inc data page on HydraBed 30 Series.
Harper Industries Inc DewEze RT Flatbed Manual.
Ox Bodies "Longhorn Reel Lift (RL) > Specialty Equipment" Product Information Web Page.
Triple C Inc "HydraLine Products" 2012.
Triple C Inc. "HydraLine Products" 2000.
CA2226913 Machine Translated Text.
FR2744711 Machine Translated Text.

* cited by examiner

HYDRAULIC TRUCK BED REEL LIFT APPARATUS

CROSS REFERENCES

This application claims the benefit of U.S. Provisional Application No. 62/478,666 filed on 30 Mar. 2017 and the benefit of U.S. Provisional Application No. 62/573,223 filed on 17 Oct. 2017.

REFERENCE TO CDS

Not Applicable.

FIELD OF THE INVENTION

The present disclosure relates to vehicles adapted to transport, to carry or to comprise special loads or objects for transporting reel units and arrangements for rotating packages in which the package, core, or former is rotated by frictional contact of its periphery with a driving surface. The present disclosure also relates to mechanisms for rotating a reel for retrieving or dispensing reelable material such as cable, wire, rope or other reelable material from a reel unit.

BACKGROUND

Self-loading bed assemblies for flat-bed trucks are useful for adapting a truck to pick-up, transport, and then feed or off-load one or more big round bales, as shown in U.S. Pat. No. 4,564,325.

The actuating mechanism for the lifting arms is located underneath the bed, and the lift arms are designed to pivot between a stored position where the arms are positioned on the top surface of the bed and an extended position for loading and unloading a reel that is positioned on the ground.

SUMMARY

We disclose a mechanism for turning a reel engaged by lifting arms. A driven wheel engages the reel by sliding adjacent to and alongside the lifting arm. The driven wheel moves between an engaged configuration where the driven wheel is in contact with the reel and an unengaged configuration where the driven wheel slides alongside the arm away from the reel.

The driven wheel is mounted to a sleeve that travels on a rail alongside a lifting arm. Turning a lead screw causes the sleeve to slide along the lifting arm. When engaged with the reel, the driven wheel can be activated to turn the reel. Turning the reel allows the reelable material to be retrieved or dispensed.

A biasing mechanism provides traction between the driven wheel and the reel. As the driven wheel is activated, the reel turns to retrieve or dispense a reelable material.

One advantage of the present disclosure is that the reel can be rewound in any arm position. Existing reel utilities offer drive mechanisms mounted on a separate moving arm. The separate moving arm is pivotally mounted to the truck side of the bed. In order to retrieve or dispense the reelable material, the separate moving arm is pivoted into position where the wheel contacts the reel.

Since our driven wheel is mounted to a lift arm, the driven wheel maintains its proximity to the reel in any lift position. For example, the lift arms can be fully extended, positioning the reel directly behind the truck, and the driven wheel can contact the reel. Alternatively, the lift arms can position the reel just above the bed surface, and the driven wheel can maintain contact with the reel.

Another advantage of mounting the driven wheel to a lift arm is that operating the retraction mechanism uses a single hydraulic source in addition to the hydraulic circuits that operate the lift arms. The reel lift apparatus uses a hydraulic circuit and the reel rotating mechanism arm uses a separate hydraulic circuit. Lifting the reel is operated independently of the reel rotating mechanism. Existing devices may utilize one hydraulic circuit to position the separate moving arm and a second hydraulic circuit to operate the reel rotating mechanism.

Another advantage is that the driven wheel can be slidably adjusted to engage a variety of reel sizes. The driven wheel slides toward the lifting arm's end distal of the bed mount to engage a smaller diameter reel. By sliding alongside the length of the lifting arm, the reel rotating mechanism can engage many different reel sizes.

Another advantage of incorporating the reel rotating mechanism on the lift arm is maximizing available bed surface space. Existing solutions can interfere with toolboxes, reel storage space, or other uses for the truck bed surface. By incorporating the reel rotating mechanism on the lift arm, no additional bed space is used. The reel rotating mechanism mounted alongside the lifting arm does not interfere with loading, unloading or transport.

In one embodiment, the driven wheel is engaged in contact with the reel by turning the lead screw. Rotation of the lead screw causes the travel nut to move along the lead screw. The driven wheel makes contact with the reel, which restricts the movement of the sleeve. The travel nut continues to move, compressing a spring that is held by the sleeve with a rear tab. The spring is compressed between the travel nut and the rear tab of the sleeve. The spring exerts its force against the front tab of the sleeve, thereby maintaining the driven wheel in contact with the reel, providing traction for driving the reel.

One advantage of the present disclosure is safer operation. The movement of the sleeve along the rail does not create the safety hazard of a pinch point between opposing hydraulically driven arms, as is seen when a hydraulic arm is brought into contact with a stationary reel. Further, there is human feedback on the pressure of the driven wheel against the reel when the operator rotates the turning mechanism.

The lift arm provides attachment points, allowing the rail to be secured to or removed from the lifting arm. The lifting arm can be configured with the appropriate attachment points. The lead screw is mounted to the rail arm. In this embodiment, the reel rotating mechanism is modular and can be attached to either lift arm or both lift arms.

Another advantage of the present disclosure is that it can be configured with two drive units, one mounted to each lift arm. A reel lift apparatus equipped with dual drive mechanisms exerts twice the torque as a single drive unit.

Another advantage of the modular design is that the reel rotating unit does not need to be purchased with the hydraulic bed. The reel rotating unit can be offered as an add on kit. Even if the user does purchase a single reel rotating mechanism, the user may later discover that more traction is required for spooling larger reels or reel rotating heavier material.

In embodiments having a first reel rotating mechanism and a second reel rotating mechanism, a first motor and a second motor can be powered in series or in parallel. For example, a pair of hydraulic motors can be plumbed in series to generate the same rotation speed and increased traction.

Alternatively, the pair of hydraulic motors can be plumbed in parallel to increase the torque and traction.

The lifting arm can be reversibly mounted to the cross member. The lifting arms are mounted to a cross member to effectuate the lowering and raising of the lifting arms. Hydraulically driven linkages cause the cross member to rotate relative to the bed. When the cross member rotates, the lifting arms move with the cross member.

The lifting arm has a mounting bracket that is mounted to the cross member. A mounting bracket is mounted perpendicular to the base member at the proximal end of the lifting arm. A latch mechanism is mounted at the distal end of the lifting arm.

Another advantage of the modular design is that the mounting brackets can be installed in two different configurations: wide configuration and narrow configuration. In the wide configuration, the reel lift apparatus can accept larger or multiple reels. In the narrow configuration, the reel lift apparatus can lift fewer or narrower reels while providing the operator more usable bed space. The modular design of the reel rotating mechanism allows the reel rotating mechanism to turn the reel in the wide configuration or the narrow configuration.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein:

FIG. 15 depicts an inside sideview of the embodiment of FIG. 14 showing the reel axle in the home position and the locking cover assembly in the closed position.

FIG. 16 depicts a side view of the locking cover assembly of FIG. 14 in isolation, with the side plate shown as transparent to show the reel axle engagement jaw.

FIG. 17 depicts a top side perspective view of the locking cover assembly.

DETAILED DESCRIPTION

Figure 1:
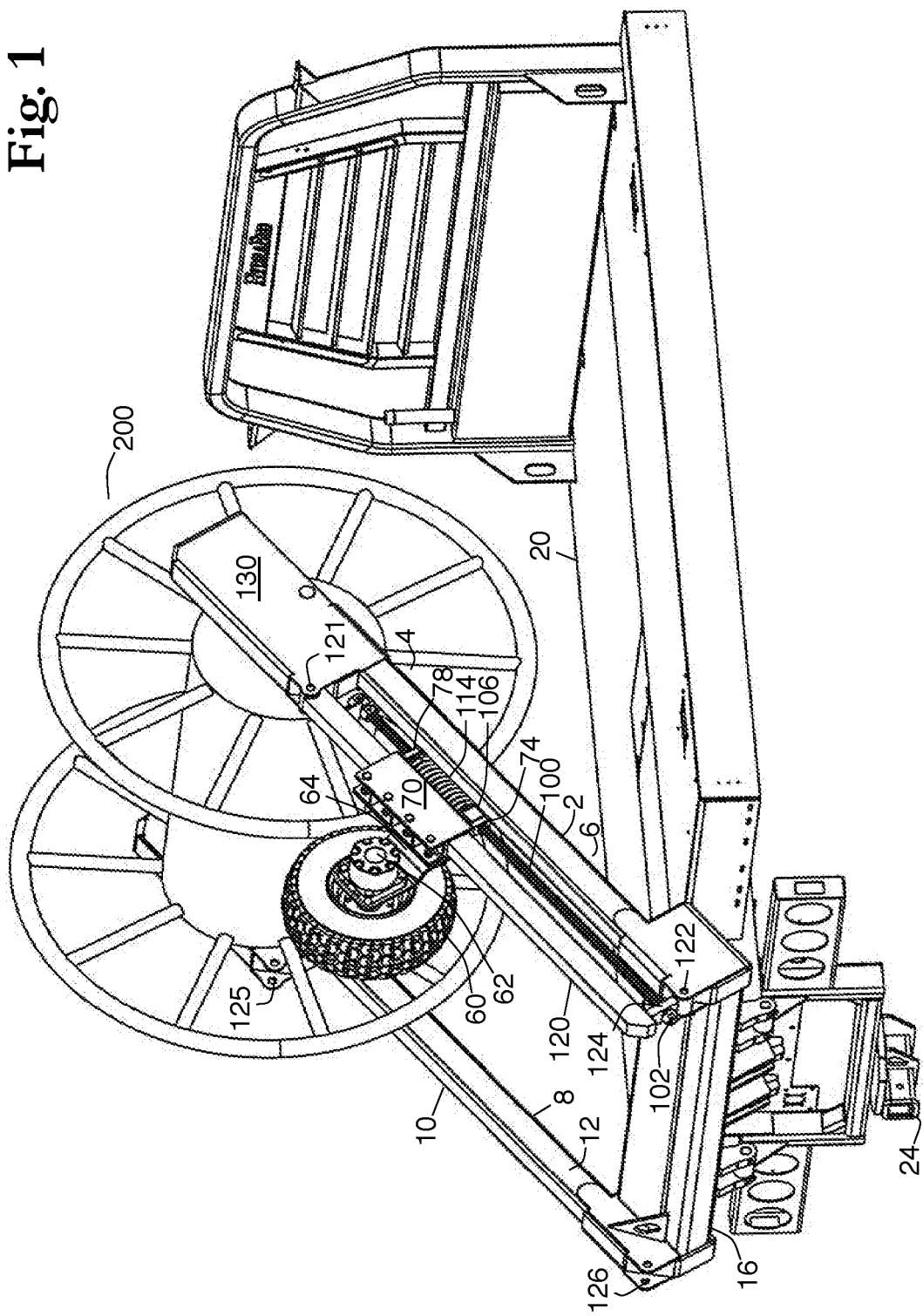
FIG. 1 depicts a side perspective view of an embodiment of the reel lift apparatus engaged with a small diameter reel.
Figure 20:
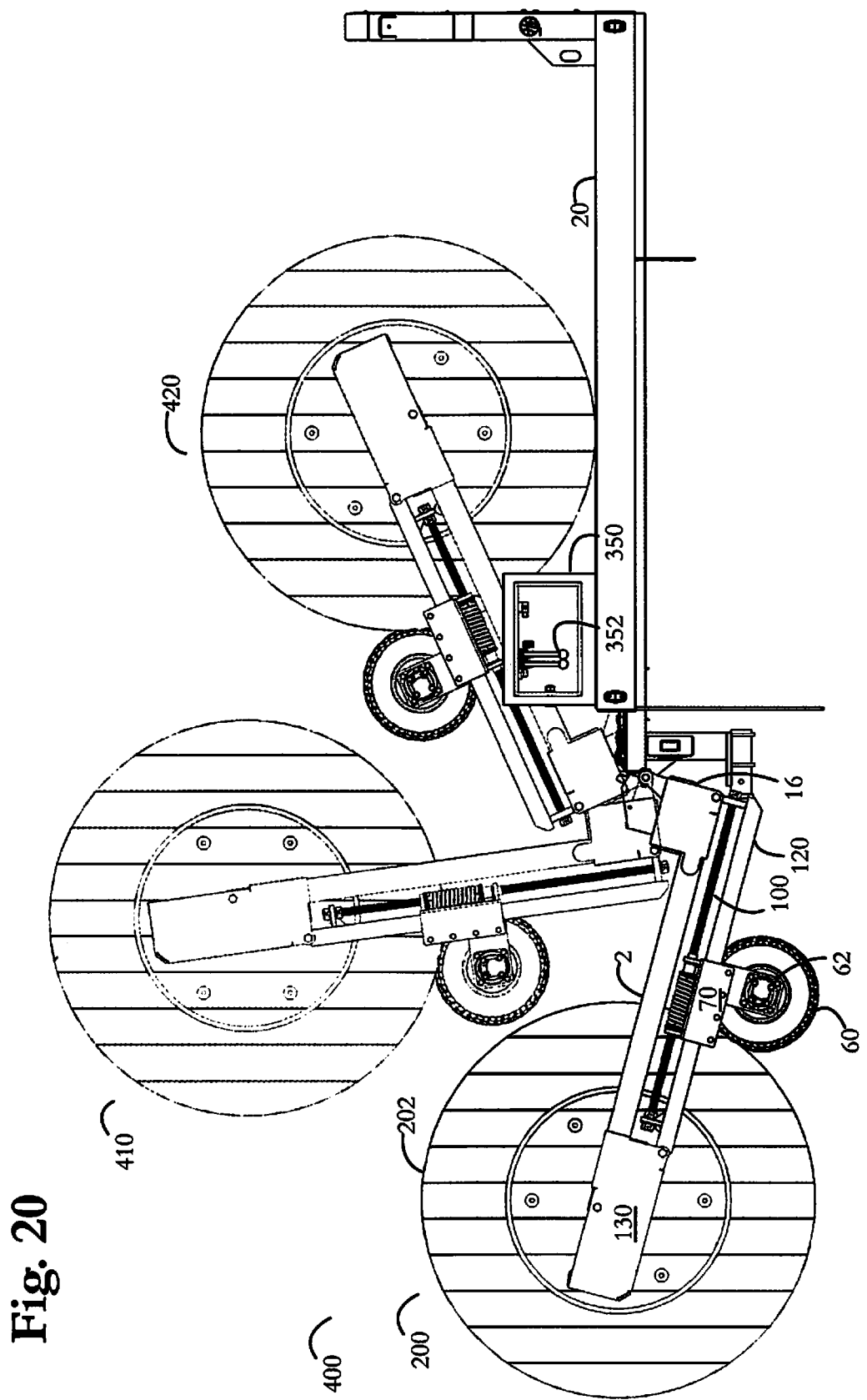
FIG. 20 depicts a side view showing three different pivot positions of the lifting arms holding a reel.

As illustrated in FIG. 1, the reel lift apparatus has a first lifting arm 2 and a second lifting arm 8. The lifting arms 2, 8 are perpendicularly mounted to a cross member 16. The lifting arms 2, 8 are pivotally mounted to the vehicle at a pivot mount, allowing the arms to pivot relative to the bed through a plurality of pivot positions, as shown in FIG. 20. For example, the lifting arms 2, 8 can be pivoted perpendicular to the bed 20 in a first pivot position. The lifting arms 2, 8 can also be pivoted to an acute angle relative to the bed 20 in a reel loaded pivot position 420 with the reel resting on the bed 20. The lifting arms 2, 8 can also be pivoted to a generally perpendicular angle relative to the bed 20 in an upright pivot position 410 with the lifted vertically above the bed 20. The lifting arms 2, 8 can also be pivoted to an obtuse angle relative to the bed 20 in an extended pivot position 400 with the reel extending behind the vehicle. The lifting arms 2, 8 can also be pivoted at an acute angle to the bed 20 in a loaded position, as shown in FIG. 1. The reel lift apparatus can be configured to be continuously pivoted through any degree of pivoting the lifting arms 2, 8, the listed pivot positions are provided as example locations of the various pivot points.

Attached to the cross member 16, the lifting arms 2, 8 form a U-shape. The cross member 16 extends across the lateral width of the bed and forms the base of the U-shape. The first lifting arm 2 and the second lifting arm 8 extend perpendicularly from the cross member 16. The first lifting arm 2 has a first distal arm portion 4 and a first proximal arm portion 6, where the first proximal arm portion 6 is mounted to the cross member 16. The second lifting arm 8 has a second distal arm portion 10 and a second proximal arm portion 12, where the second proximal arm portion 12 is mounted to the cross member 16. Each of the lifting arms 2, 8 has a respective longitudinal axis generally parallel to the long dimension of the arm.

In the extended position, the cross member 16 is higher than the arms 2, 8. In the retracted position, the cross member 16 can be flush with the bed surface 20. The arms 2, 8 lay on top of the bed surface 20 in the unloaded travel position.

Figure 7:
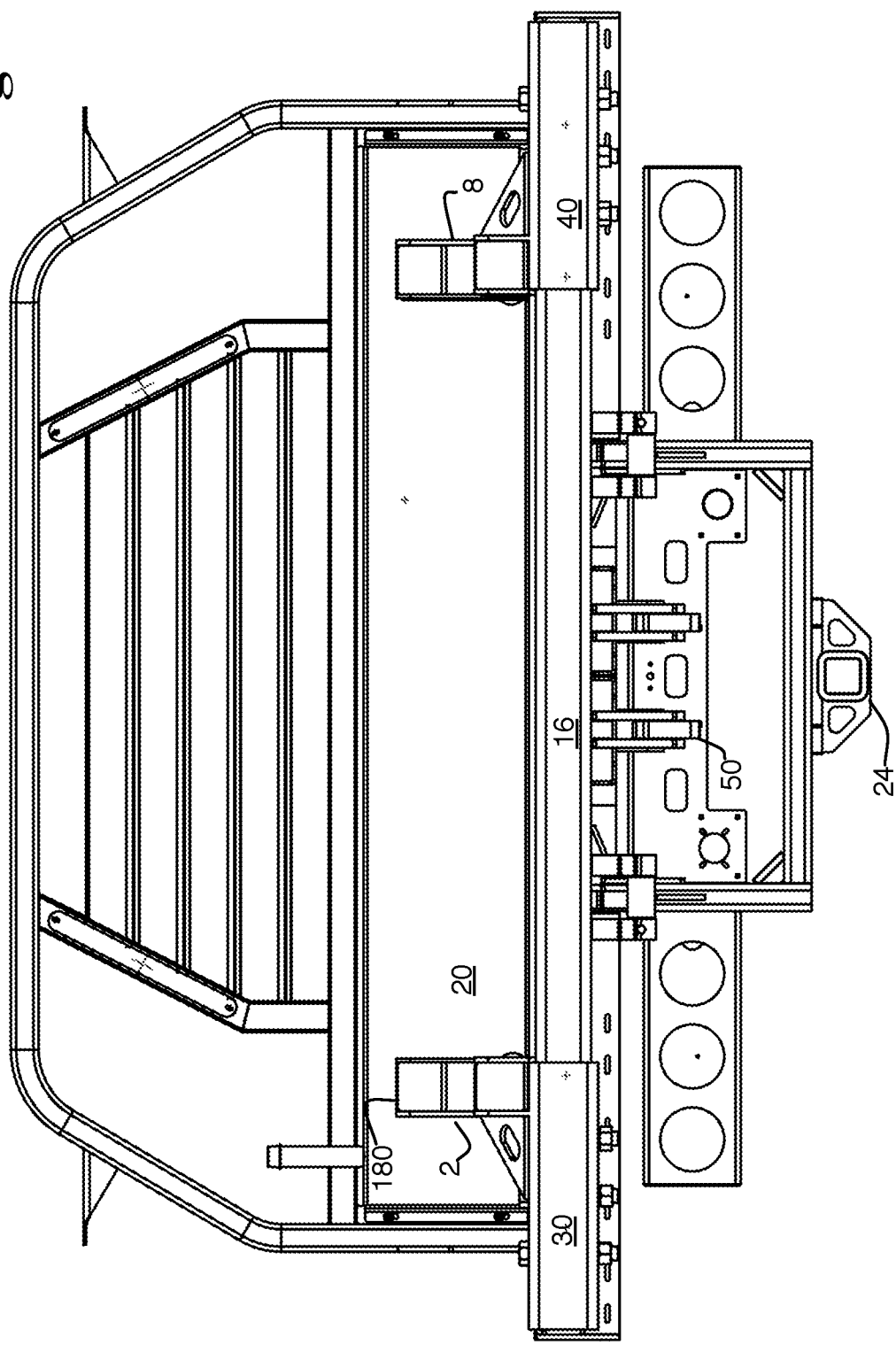
FIG. 7 depicts a rear perspective view of an embodiment of the modular lifting arms in the narrow configuration.
Figure 8:
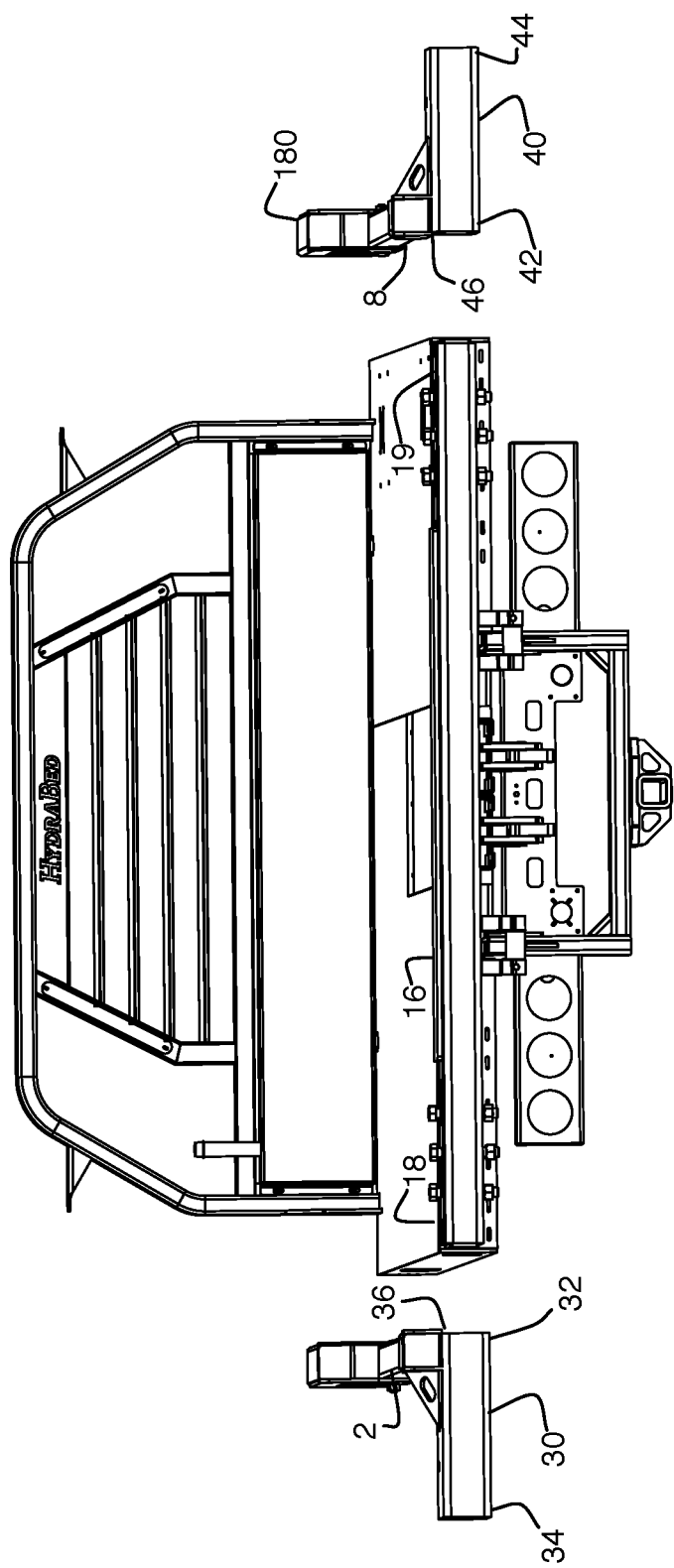
FIG. 8 depicts a partially exploded view of the embodiment of FIG. 7, showing the mounting brackets and lifting arms removed from the cross member.

The lifting arms 2, 8 are depicted as having a rectangular cross section. The lifting arms 2, 8 can have a square, rectangular, circular, or otherwise curved cross section. The lifting arms can be made of iron, steel, aluminum, or other sufficiently strong material. The lifting arms 2, 8 can be directly welded upon the cross member 16. Alternatively, the lifting arms 2, 8 can be removably mounted to the cross member 16 with a mounting bracket 30. The mounting bracket 30 can be bolted to the cross member 16. As shown in FIGS. 7-8, the mounting bracket 30 can be slidably mounted to the cross member 16, wherein the mounting bracket 30 receives a first end portion of the cross member 16 through a complementary aperture in the mounting bracket 30.

Figure 2:
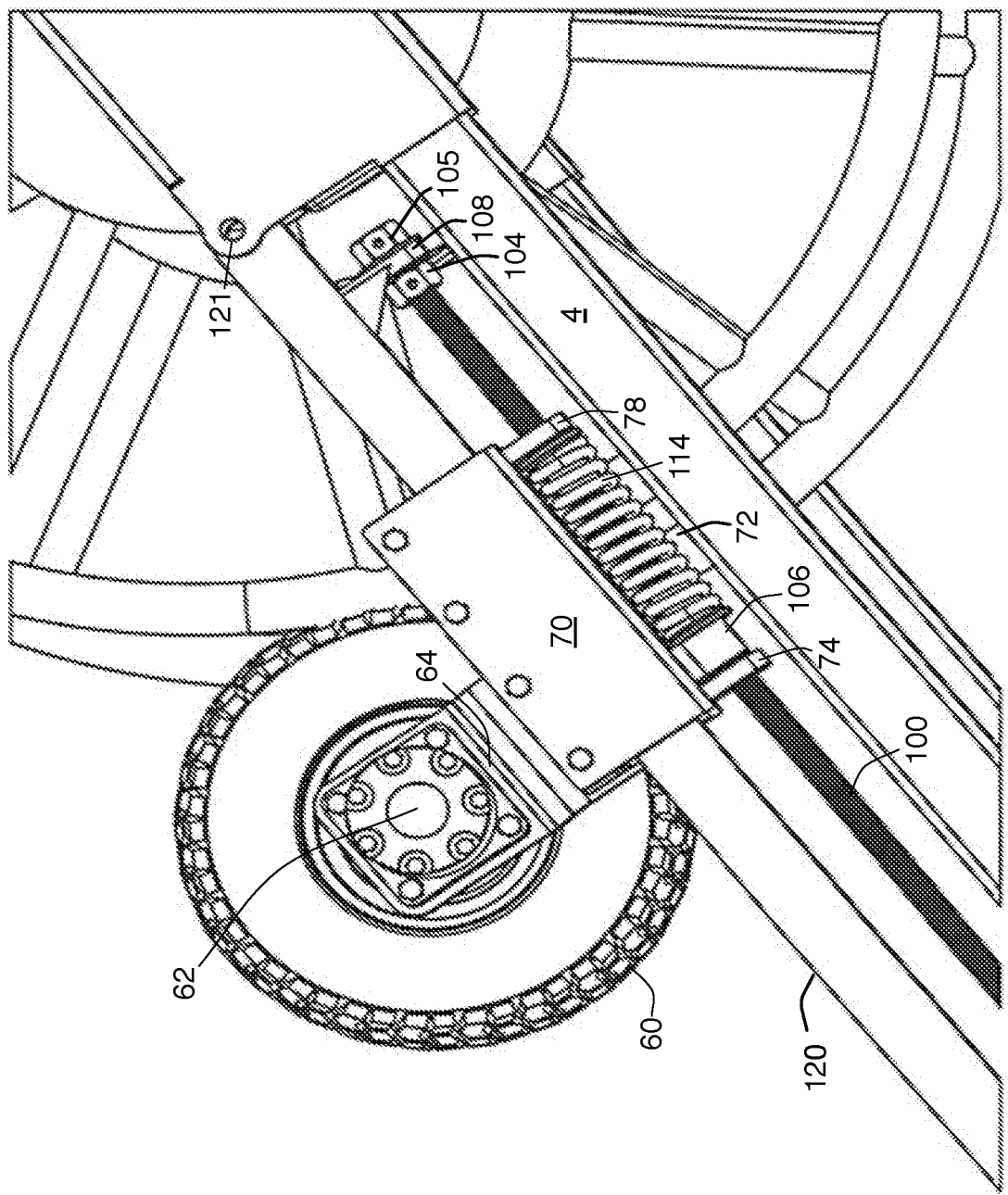
FIG. 2 depicts an enlarged view of the embodiment of FIG. 1 showing the driven wheel engaged with a small diameter reel.

As illustrated in FIG. 2, the reel lift apparatus has a slide rail 120 upon which the sleeve 70 slides. The slide rail 120 can be mounted parallel to the longitudinal axis of one or both of the lifting arms 2, 8. As shown in FIG. 1, the rail 120 can be mounted to the distal rail mount 121 and the proximal rail mount 122. A rail support 124 is disposed at the proximal end of the rail 120. The slide rail 120 is mounted at an offset distance from the lifting arm 2, 8. The offset is determined by the height of the rail support 124. The distal end of the rail is mounted to the proximal rail mount 122 located at the axle slot assembly 130. The rail 120 is generally the same length of the lifting arm 2, 8. As such, the sliding rail 120 does not up any additional bed space relative to the lifting arms 2, 8.

Alternatively, the sliding rail can be mounted to the third rail mount 125 and the fourth rail mount 126. This configuration allows the driven wheel 60 to engage a rim of the reel 200 at the second lifting arm 8 to rim drive the reel. Alternatively, a second rail (not shown) can be mounted to the third rail mount 125 and the fourth rail mount 126 in addition to the first sliding rail 120.

The rail 120 is depicted as having a rectangular cross section, such as a square iron pipe. The rail 120 can have a square, rectangular, circular, or otherwise curved cross section. The rail can be made of iron, steel, aluminum, or other sufficiently strong material. The rail 120 can be removably mounted to the lifting arms 2, 8 as discussed above. Alternatively, the rail 120 can be directly welded to the lifting arms 2, 8. Alternatively, the rail 120 can be removably mounted to the cross member 16.

Alternatively, the sleeve can be slidably mounted to a respective lifting arm 2, 8. In this way, a separate rail 120 would not be needed, and the driven wheel would continue to travel alongside the respective lifting arms 2, 8. The sleeve 70 would receive the respective lifting arm 2, 8 in the same way the illustrated embodiment receives the rail 120.

As illustrated in FIG. 1, a sleeve 70 is mounted to the rail 120. The sleeve 70 is shown as a rectangular pipe. The internal dimensions of the opening in the sleeve 70 correspond to the external dimensions of the sliding rail 120. During operation, the sleeve 70 receives the sliding rail 120. The sleeve 70 may be guided along the axis parallel to the longitudinal axis of the respective lifting arm 2, 8 by the rail 120. The sleeve 70 may be configured to travel back and forth in an axis parallel to the longitudinal axis of the lifting arm 2.

The sleeve 70 is depicted as a rectangular pipe with an internal opening having a width and height that corresponds to the width and height of the rail 120. The sleeve 70 has a cross section that corresponds with the cross section of the rail 120. In an alternative embodiment where the sleeve 70 travels along the lifting arm 2, 8, the sleeve 70 has an internal opening that corresponds with the width, height, and cross section of the lifting arm 2, 8. The length of the sleeve may correspond to the length of the spring 114 necessary to provide a sufficient traction force to ensure traction between the driven wheel 60 and the reel 200. The traction force allows the driven wheel 60 to rotate the reel 200 by contact with the reel rim 202.

Figure 3:
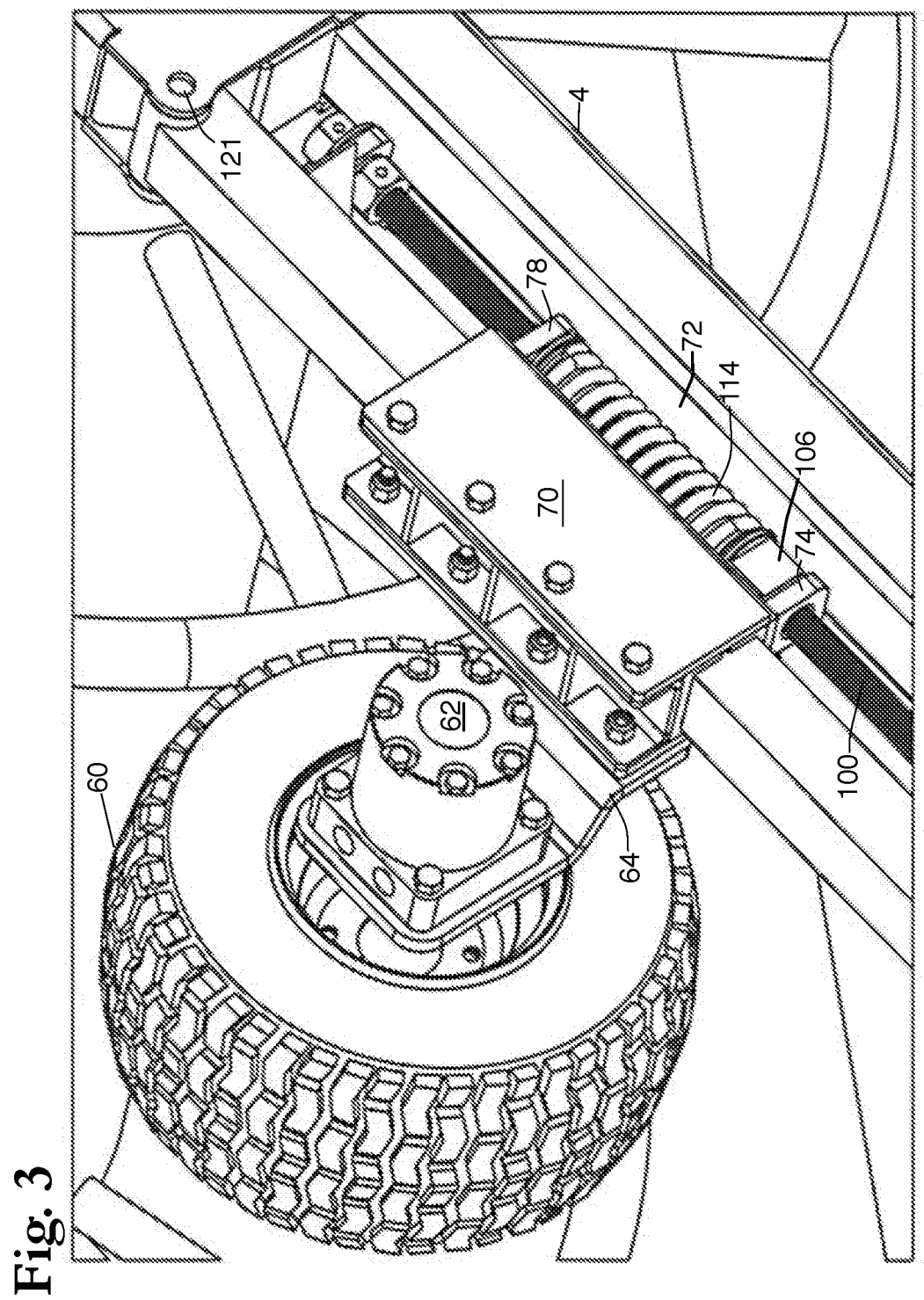
FIG. 3 depicts an enlarged view of a top perspective of the driven wheel and sleeve on the rail of the embodiment of FIG. 1.
Figure 4:
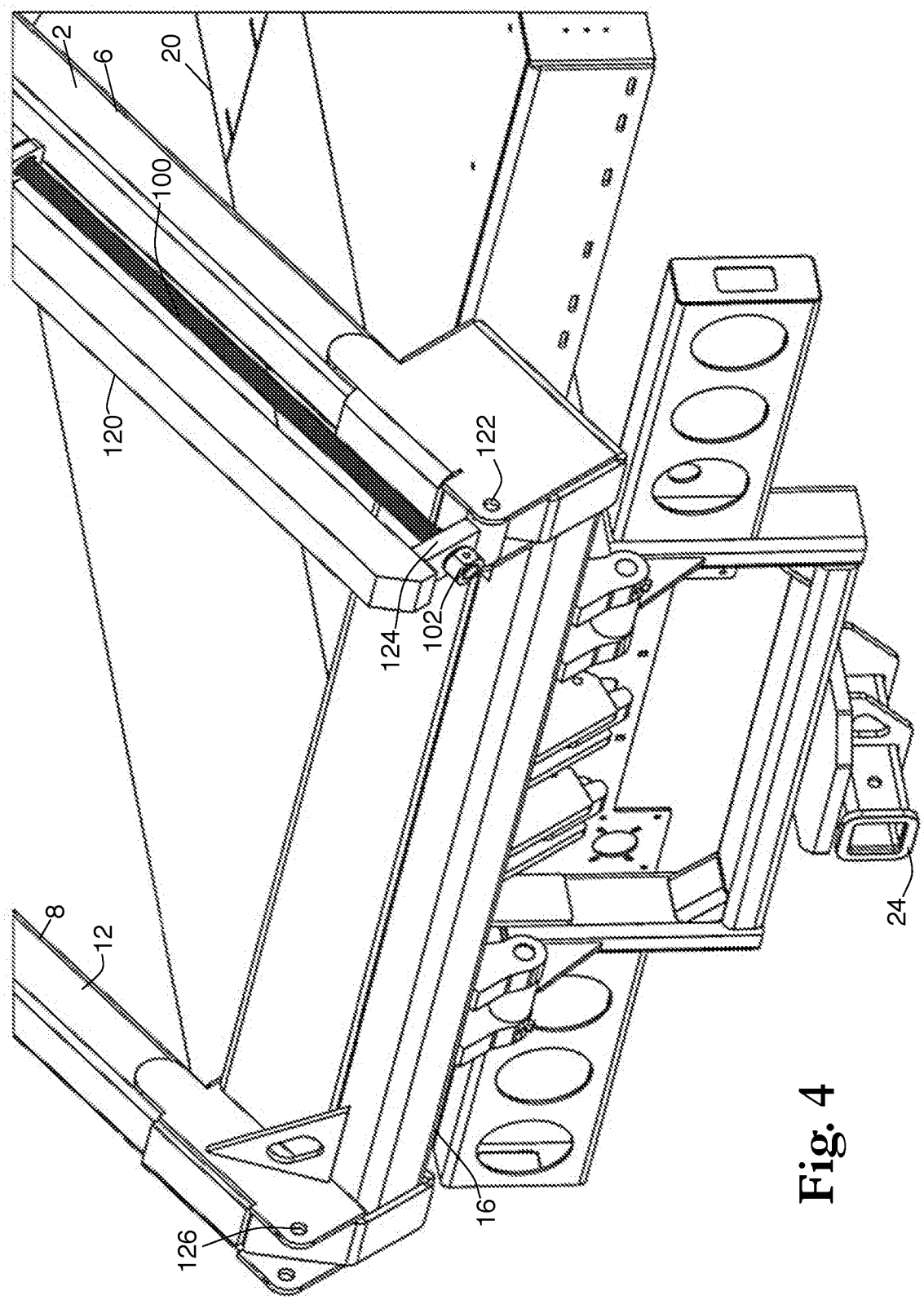
FIG. 4 depicts an enlarged rear side perspective view of the lead screw and turning mechanism of the embodiment of FIG. 1.

In addition to the slide illustrated in FIGS. 1-3 comprising the sleeve 70 receiving the rail 120, alternate embodiments of the slide mechanism are contemplated. Alternatively, the slide mechanism comprises an insert element configured to slide within the rail or within a lifting arm 2, 8. For example, the motor mount 64 is received into a slot in the rail 120. A t-shaped motor mount 64 could extend through the slot in the rail 120, thereby providing similar movement through the rail. A similar biasing mechanism and lead screw 100 could be disposed within the rail 120 or within a lifting arm 2, 8.

In another embodiment, the slide mechanism comprises a rail guide system. In a rail guide system, the rail 120 is keyed such that a non-rotating linear bearing is capable of longitudinally sliding on the rail. To that effect, the rail 120 could have a square cross section or a circular cross section with a notch, groove, bump, bulge, or blip that corresponds to a corresponding keyed non-rotating linear bearing. A commercially available example of this type of slide mechanism is the IGUS DryLin® line of sliders. The sliders can comprise ball bearings or plastic linear guides.

As illustrated in FIG. 1, a lead screw 100 extends along the length of the rail 120. The lead screw 100 is a threaded shaft used to convert rotation to longitudinal motion. A turning mechanism 102 is mounted to the proximal end of the lead screw 100. As illustrated, the turning mechanism can be a hexagonal nut secured to the shaft, such that turning the nut results in the shaft turning. The lead screw is held in place by being passed through a rail support 124 and a distal support flange 108, as well as being held in place by a first fixed nut 104 and a second fixed nut 105. The first fixed nut 104 and the second fixed nut 105 are free to turn with the lead screw 100. Appropriate washers are utilized to enable the rotation of the fixed nuts 104, 105 with the lead screw 100. The lead screw 100 passes through the rail support 124 and a screw tab 108 as shown in FIG. 2. The lead screw 100 may be disposed generally parallel to the rail 120 and the respective lifting arm 2, 8.

Figure 13:
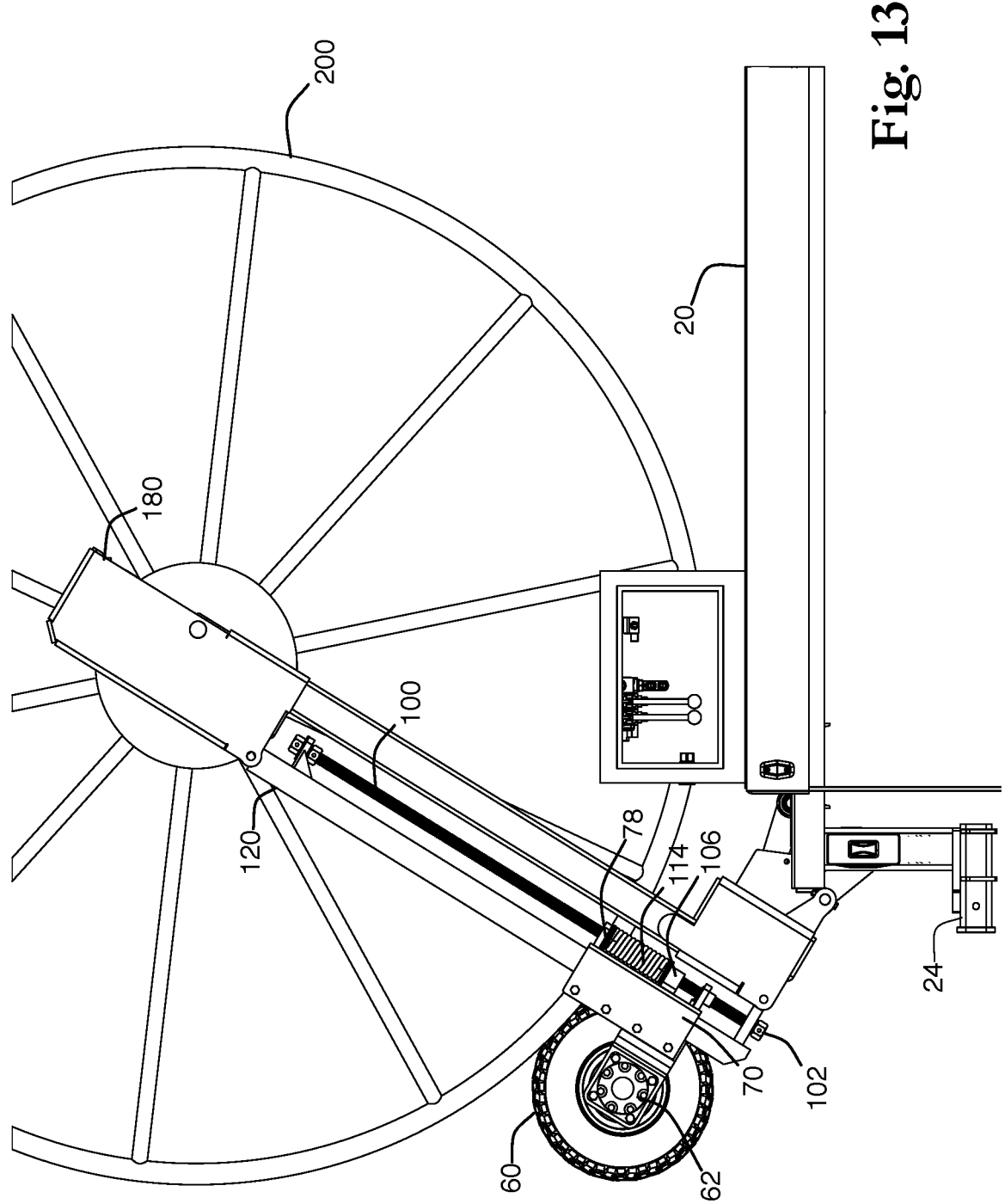
FIG. 13 depicts a side perspective view of a driven wheel engaged with a larger diameter reel showing compression of the spring.
Figures 15, 16, 17:
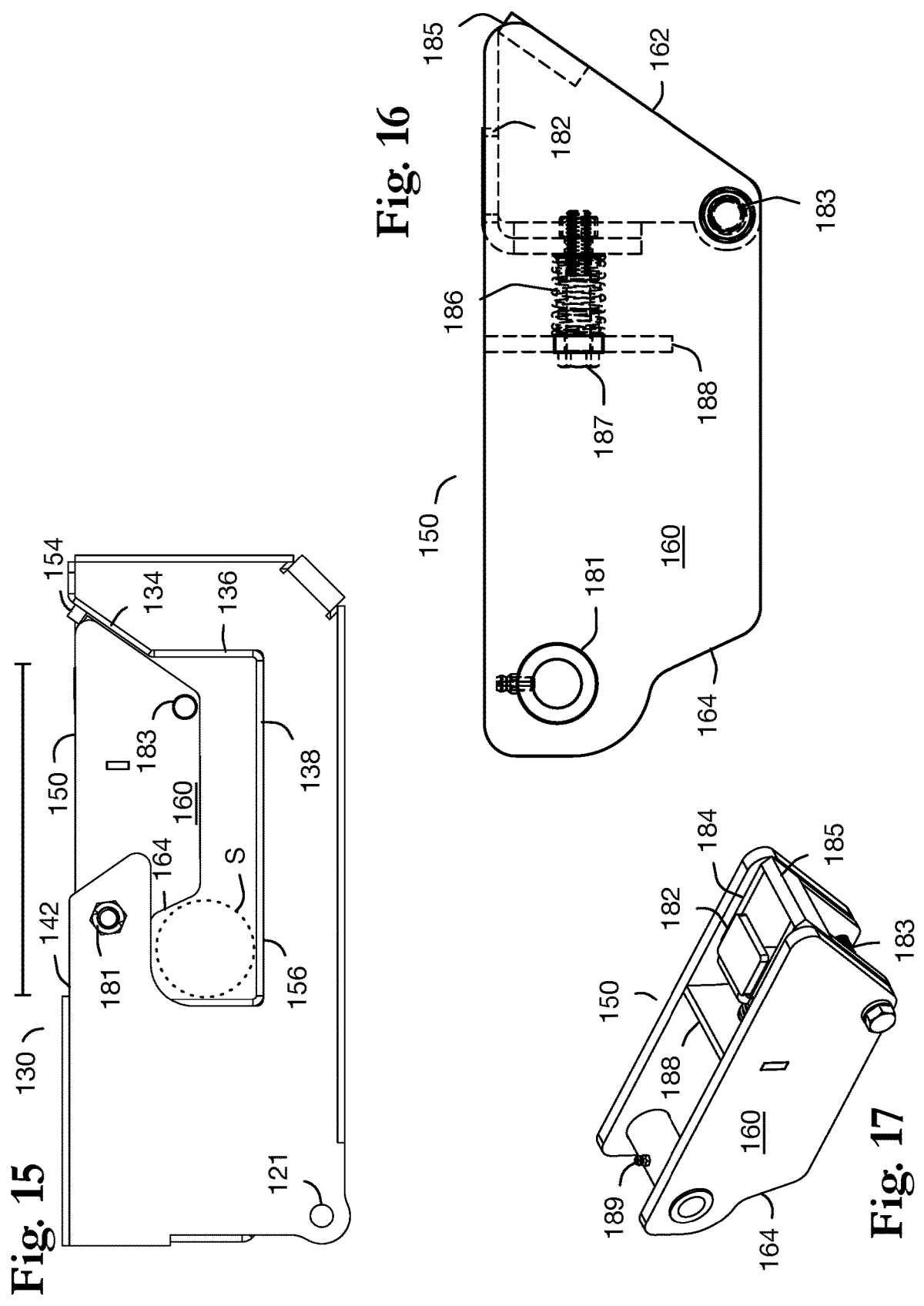

As illustrated in FIG. 2, a travel nut 106 is threadably received onto the lead screw 100. The travel nut 106 is prevented from rotating. The travel nut 106 is in a relationship with the sleeve 70 that prevents the travel nut from rotating. This relationship is best shown in FIG. 15, where the travel nut 106 contacts the sleeve 70 to prevent rotation. Rotation of the lead screw 100 in a first direction causes the travel nut 106 to move toward the distal end of the rail 120. Rotation of the lead screw 100 in the opposite direction causes the travel nut 106 to move toward the proximal end of the rail 120. The sleeve 70 and the driven wheel 60 travel with the travel nut 106 until the driven wheel 60 contacts the reel 200. Once the driven wheel 60 contacts the reel 200, substantial movement of the sleeve 70 ceases. As the travel nut 106 continues to move, according to the rotation of the lead screw, the spring 114 is compressed. The spring 114 is compressed between the travel nut 106 and the rear tab 78. In the most relaxed position of the spring 114, the travel nut 106 is in contact with the front tab 74. Optionally, appropriate washers may be disposed between the travel nut 106 and the front tab 74. As the travel nut moves from the front tab 74 and toward the rear tab 78, the spring 114 is compressed, which is shown in FIG. 13. Pressure from the spring 114 unto the sleeve 70 through the rear tab 78 maintains the wheel in contact with the reel 200. It is known that reels 200 can be out of round, meaning the diameter of the reel is not always consistent. The spring 114 maintains traction between the driven wheel 60 and the reel 200 even if the diameter of the reel 200 changes.

The linear drive mechanism is depicted as a lead screw 100. And the lead screw 100 is depicted as an acme screw. Alternatively, the linear drive mechanism can comprise a lead screw, spindle drive, belt drive, toothed belt, linear actuator, or a linear motor. A linear motor can comprise any device capable of generating linear motion. The power source for the linear drive mechanism can be electric, hydraulic, pneumatic, or manual.

The linear drive mechanism could be positioned inside of the rail 120 or inside of the lifting arm 2, 8. Alternatively, the linear drive mechanism can be disposed to a lateral side of the rail 120 or the lifting arm 2, 8.

Figure 5:
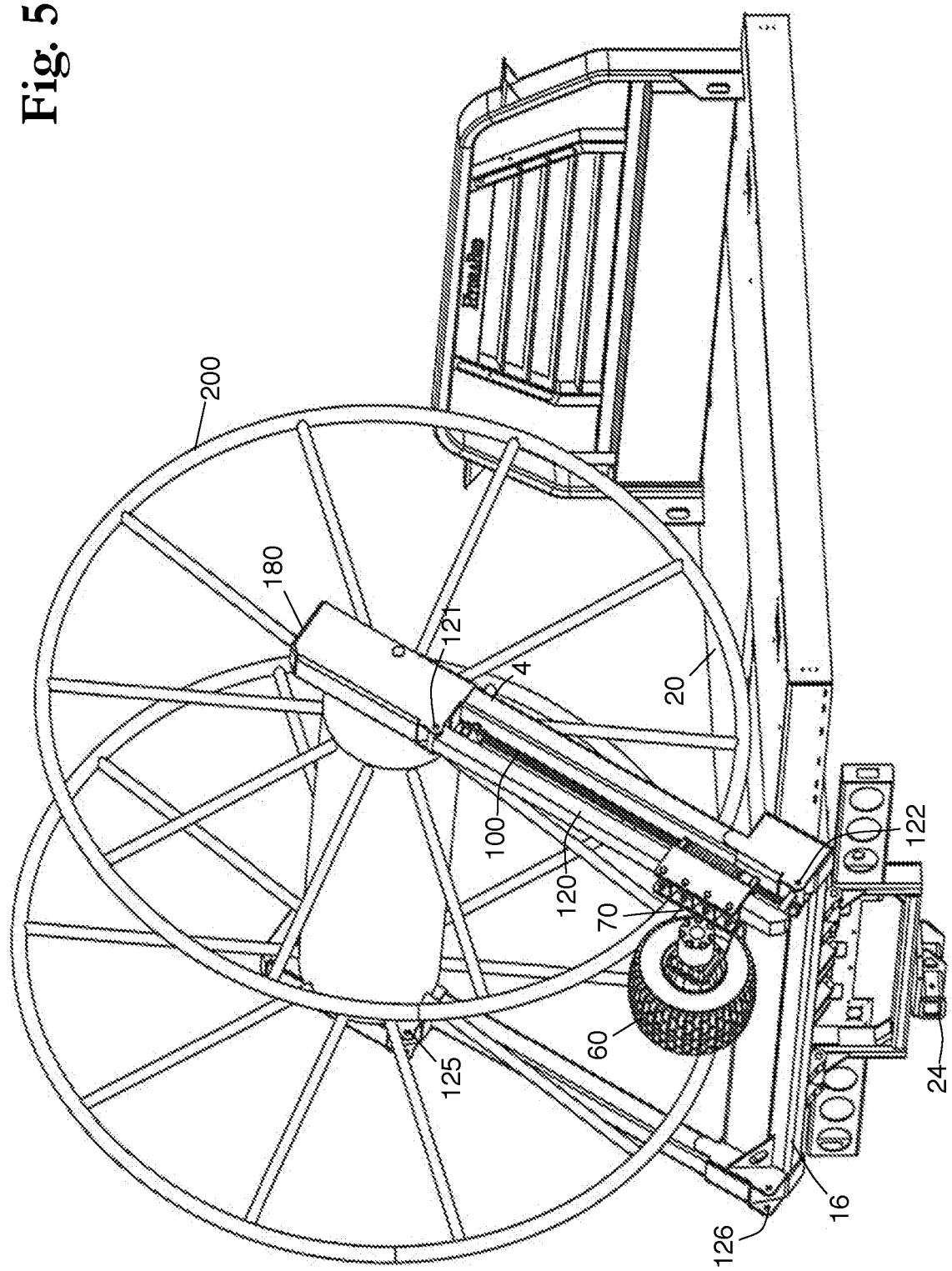
FIG. 5 depicts a rear side perspective view the reel lift apparatus of FIG. 1 engaged with a larger diameter reel.

The reel lift apparatus has two general configurations: an unengaged configuration and an engaged configuration. The lead screw 100 is turned so that the travel nut 106 drives the sleeve 70 to the proximal end of the rail 120 in order to place the reel lift apparatus in the unengaged configuration. In the unengaged configuration, the driven wheel 60 is located near the proximal end of the rail 120, and away from the axle slot assembly 130. In this way, the driven wheel 60 does not interfere with the loading or unloading of the reel 200. In the engaged configuration, the driven wheel 60 is in contact with the reel 200, as shown in FIG. 1 and FIG. 5. The location of the driven wheel 60 in the engaged configuration depends on the diameter of the reel 200.

Figure 6:
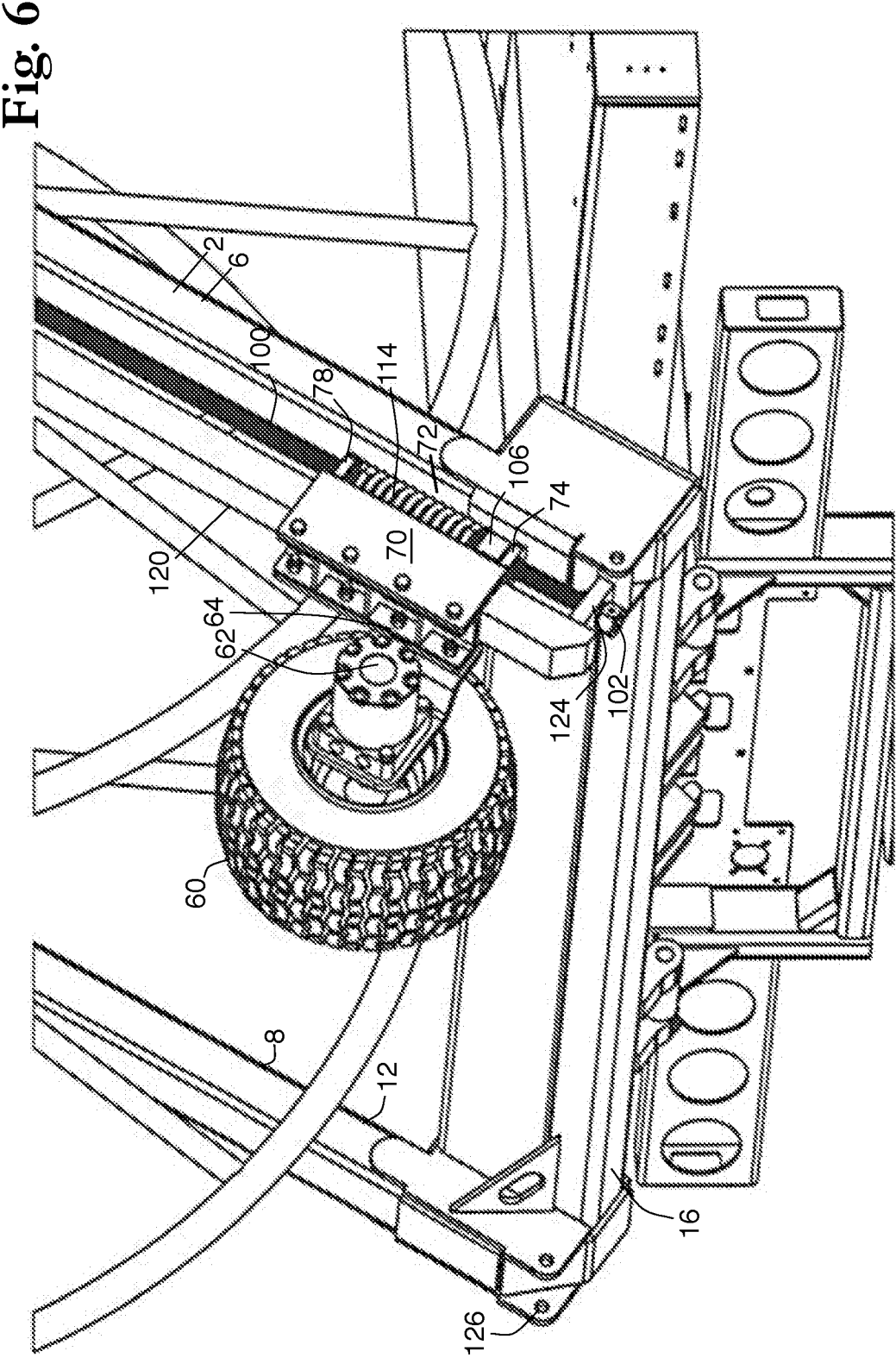
FIG. 6 depicts an enlarged view of the embodiment of FIG. 5 focused on the driven wheel engagement with a reel having a larger diameter.

The lead screw 100 allows the reel lift apparatus to handle a variety of sizes of reels 200. A smaller diameter reel is shown in FIGS. 1-4 and a larger diameter reel is shown in FIGS. 5-6 and 13. Being able to travel on the rail 120 along approximately the entire distance of the lifting arms 2, 8 allows the driven wheel 60 to accommodate a variety of reel sizes. For example, the reel lift apparatus illustrated in FIGS. 1-6 can accommodate reels having a radius approximately as long as the longitudinal length of the lifting arms 2, 8.

The turning mechanism 102 is illustrated as a hexagonal nut rotationally coupled to the lead screw 100. As such, the turning mechanism 102 can be operating by a torque wrench or an impact wrench. Alternatively, the turning mechanism 102 can comprise a handle. Alternatively, the turning mechanism 102 can be hydraulically or electronically actuated.

As illustrated in FIG. 3, a driven wheel 60 is mounted to a motor mount 64 that travels with the sleeve 70. The motor mount 64 elevates the driven wheel 60 above the sleeve. The wheel 60 is driven by a motor 62. In the engaged position, the wheel 60 contacts the reel 200. As illustrated, the wheel 60 comprises a rubber tire. In the engaged position, the driven wheel 60 is maintained in contact by the spring compression mount 72 in cooperation with the sleeve 70 as described above. The spring compression mount 72 directs the force generated by the linear drive mechanism compressing the spring 114 and applying the tension to maintain the sleeve 70 pushed toward the distal end of the lifting arm 2, 8. The spring compression mount 72 allows the system to maintain traction between the driven wheel 60 and the sleeve 70 even with a reel 200 that has a varying diameter.

Since the driven wheel 60 is mounted to a lift arm 2, 8, the driven wheel maintains its proximity to the reel 200 in any lift position or pivot position. For example, the lift arms 2, 8 can be fully extended thereby positioning the reel 200 directly behind the truck, and the driven wheel 60 may be configured to slide parallel to the longitudinal axis of the lifting arms to engage and contact the reel. Alternatively, the lift arms 2, 8 can position the reel 200 just above the bed surface 20, and the driven wheel 60 may be configured to slide alongside the lifting arm 2, 8 in an axis parallel to the longitudinal axis of the lifting arm to contact and drive the reel 200. Another advantage is that the driven wheel 60 can be slidably adjusted to engage a variety of reel sizes. The driven wheel 60 slides toward the distal end of the lifting arm 2, 8 to engage a reel 200 having a smaller diameter. By sliding across the length of the lifting arms 2, 8, the reel rotating mechanism can engage many different reel sizes.

Figure 10:
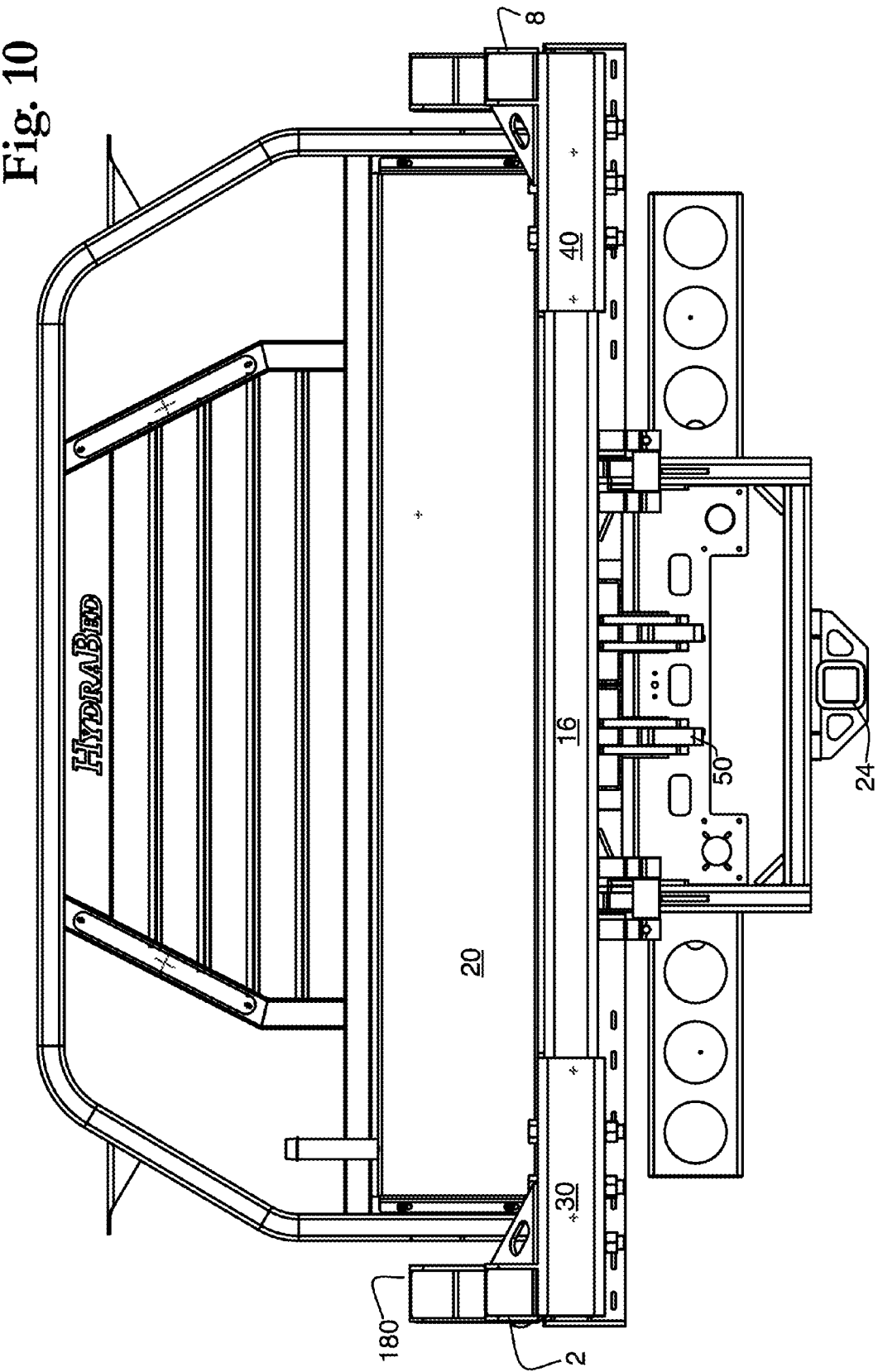
FIG. 10 depicts a rear perspective view of the embodiment of FIG. 7 with the lifting arms mounted in the wide configuration.
Figure 11:
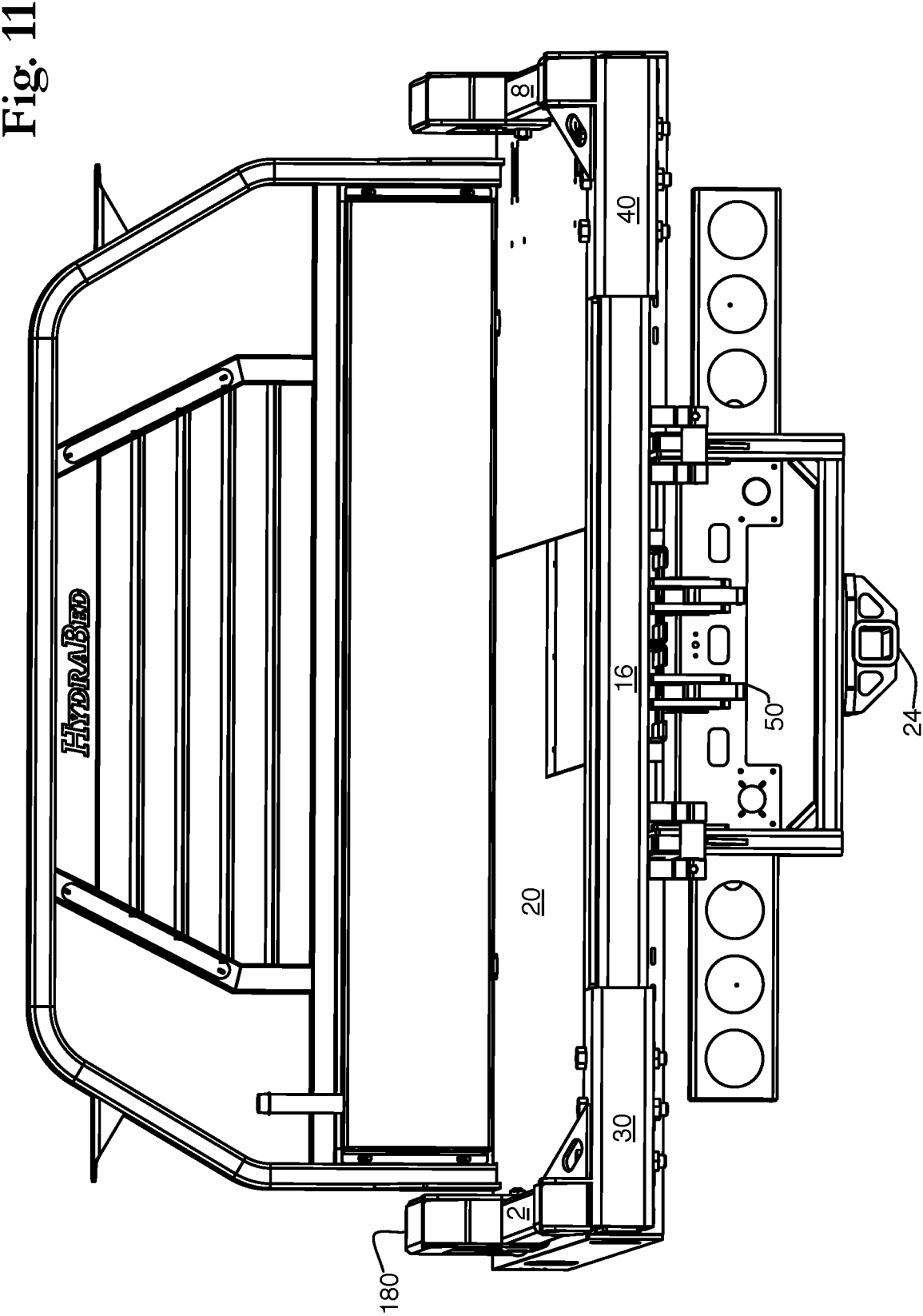
FIG. 11 depicts a top rear perspective view of the embodiment of FIG. 7 in the wide configuration.

As illustrated in FIG. 8, the first lifting arm 2 can be mounted to the cross member 16 at each peripheral end of the cross member 16 with a first mounting bracket 30. The first lifting arm 2 can be mounted at an arm mount portion 32 of the first mounting bracket 30. A free portion 34 is opposite the arm mount portion 32 of the mounting bracket 30. The mounting bracket 30 is illustrated as a square pipe with an internal opening. The internal opening has dimensions that correspond to the dimensions of the cross member 16. The cross member 16 has a first end portion 18 and a second end portion 19. The respective lifting arm 2, 8 is mounted to a top portion 36, 46 of the arm mount portion 32, 42 of the mounting bracket 30, 40. As illustrated in FIG. 8, the first mounting bracket 30 can be mounted to the first end portion 18 of the cross member 16. In this orientation, the arm mount portion 32 is disposed toward the middle of the bed surface 20. As such, the lifting arms 2, 8 are capable of lifting a narrower reel. As illustrated in FIG. 10, the first mounting bracket 30 can be mounted to the second end portion 19. In this orientation, the arm mount portion 32 is disposed toward the periphery of the bed surface 20. As such, the lifting arms 2, 8 are capable of lifting a wider reel or multiple reels disposed on the same reel axle 204. The first mounting bracket 30 is mounted to the first lifting arm 2 is a mirror image of the second mounting bracket 40 mounted to the second lifting arm 8.

Similarly, the second lifting arm 8 can be mounted with a second mounting bracket 40. The second lifting arm 8 can be mounted at an arm mount portion 42 of the mounting bracket 40. A free portion 44 is opposite the arm mount portion 42 of the second mounting bracket 40. The mounting bracket 40 is illustrated as a square pipe with an internal opening. The internal opening has dimensions that correspond to the dimensions of the cross member 16. The cross member 16 has a first end portion 18 and a second end portion 19. The respective lifting arm 2, 8 is mounted to a top portion 36 of the arm mount portion 32 of the mounting bracket 30. As illustrated in FIG. 8, the mounting bracket 30 can be mounted to the second end portion 19 of the cross member 16. In this orientation, the arm mount portion 42 is disposed toward the middle of the bed surface 20. As such, the lifting arms 2, 8 are capable of lifting a narrower reel. As illustrated in FIG. 10, the second mounting bracket 40 can be mounted upon the cross member 16 at the second end portion. In this orientation, the arm mount portion 42 is disposed toward the periphery of the bed surface 20. As such, the lifting arms 2, 8 are capable of lifting a wider reel or multiple reels disposed on the same reel axle 204.

In one configuration, the arms 2, 8 are fixed at a width more narrow than the bed. This configuration allows toolboxes to be mounted to the outside portions of the along the length of the periphery of the bed surface 20.

In one embodiment, a reel lift apparatus could comprise both lifting arms mounted to respective first mounting brackets 30. In this configuration, the lifting arms 2, 8 would be offset from the center of the bed surface 20. As such, a row of toolboxes could be installed on one peripheral side of the bed surface 20.

Figure 9:
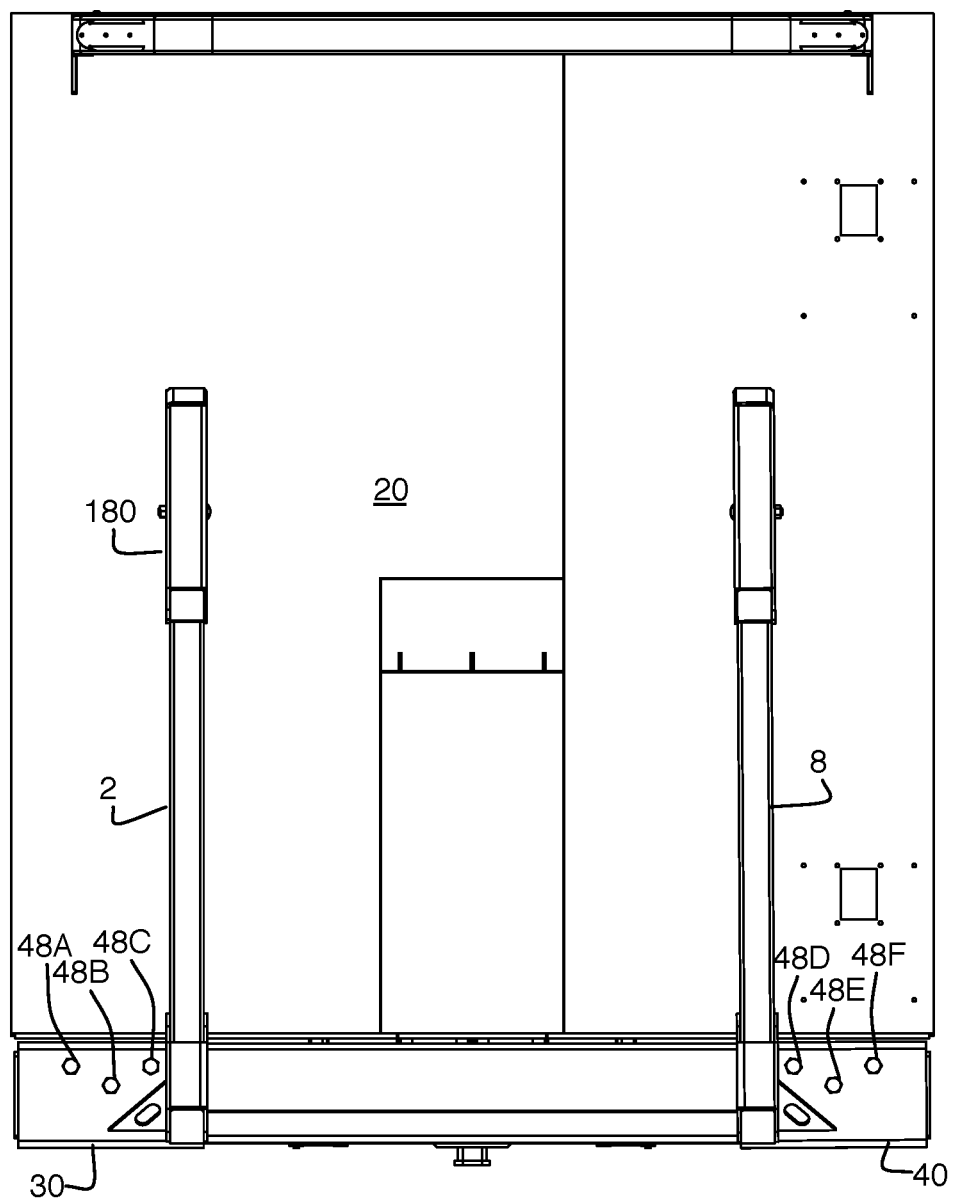
FIG. 9 depicts a top perspective view of the embodiment of FIG. 7 in the narrow configuration, with the lifting arms in the stored position.
Figure 12:
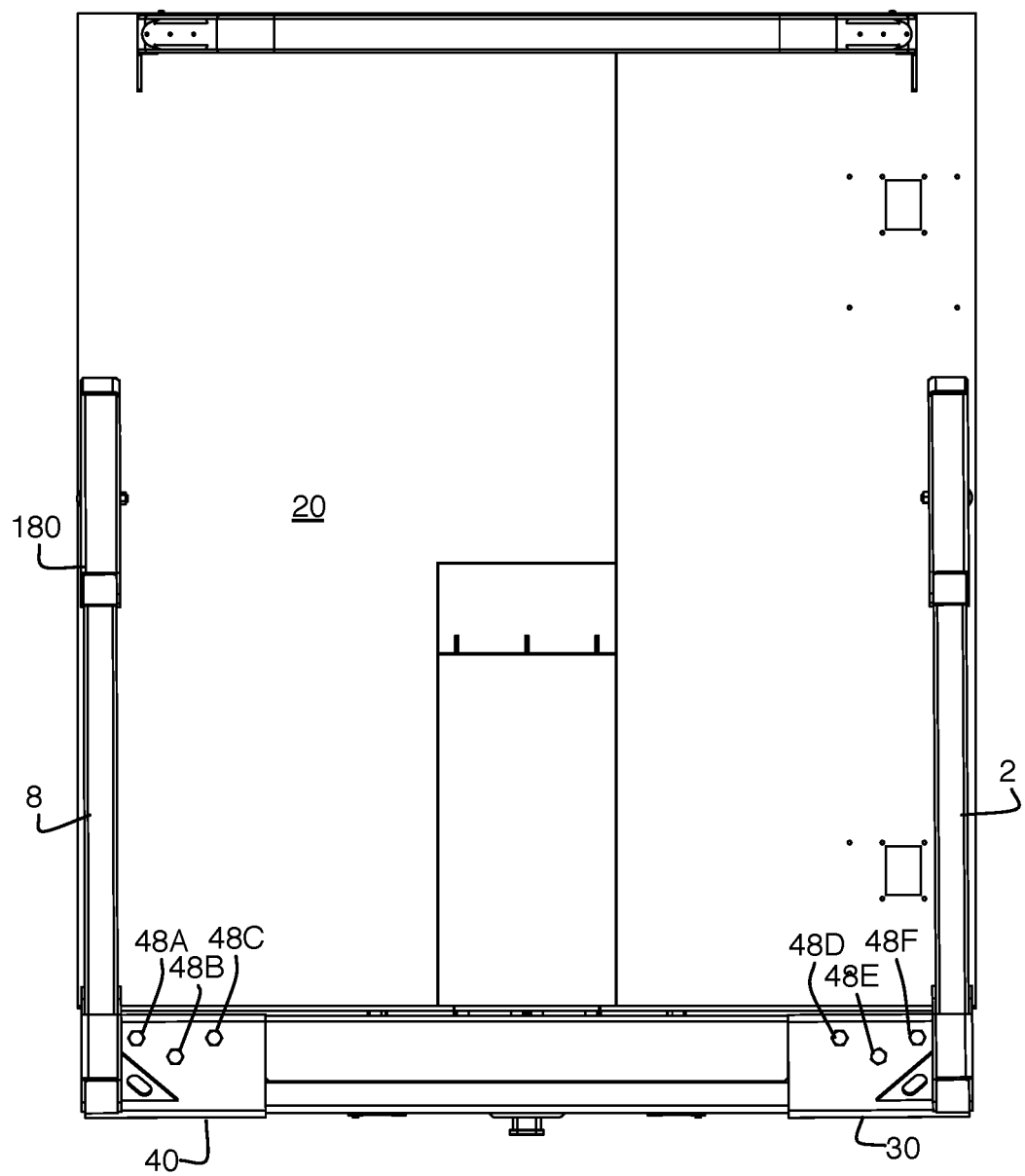
FIG. 12 depicts top view of the embodiment of FIG. 7 in the wide configuration.

In another embodiment, the first mounting bracket 30 and the second mounting bracket 40 could have a plurality of mounting slots for mounting to the cross member 16. This embodiment is shown in FIGS. 9 and 12. The first mounting bracket 30 and second mounting bracket 40 have a bolt pattern. The cross member 16 has a mounting slot pattern. The respective lifting arm 2, 8 is mounted at one end of the mounting bracket. In FIG. 13, the first mounting bracket 30 is mounted to mounting slots 48A, 48B, and 48C and the second mounting bracket 40 is mounted to mounting slots 48D, 48E, and 48F. FIG. 9 shows the narrow configuration. In FIG. 12, the first mounting bracket 30 is mounted to mounting slots 48D, 48E, and 48F and the second mounting bracket 40 is mounted to mounting slots 48A, 48B, and 48C. FIG. 12 shows the wide configuration.

In the illustrated embodiment, the arms 2, 8 are fixed at an angle perpendicular to the cross member and do not pivot relative to the cross member 16.

In order to securely hold the reel 200, the reel axle 204 is received into an axle slot assembly 130, as shown in FIG. 15. An axle slot assembly 130 is located at the distal end of each arm 2, 8—the distal end of the arm being the end distal from point where the arm connects to the bed surface 20. As illustrated in FIGS. 14-18, the axle slot assembly 130 has a solid exterior wall 132 to prevent the reel axle 204 from lateral movement. The distal end of the slot has a distal sloped wall 134, adjacent to the distal slot wall 136, inwardly sloping down toward the slot. As such, the reel axle 204 is encouraged into the slot 138 as the arm 2, 8 is lifted up. The slot 138 has a slot floor 151 at the bottom of the slot.

The depth of the slot 138 corresponds approximately to the height of the reel axle 204 as shown in FIG. 15. In the extended arm position, the slot opening 140 faces upwards. In order to load a reel 200, the user extends the arms 2, 8 to the extended position and opens the locking cover assembly 150. The truck is backed into position until the slot opening 140 is below the reel axle 204. The user raises the arms 2, 8 such that the reel axle 204 is received into the axle slot assembly 130 through the slot opening 140. Once the arms 2, 8 lift the reel 200 off the ground and above an angle perpendicular to the ground, the reel 200 slides or rolls under force of gravity into a home position 156 under the fixed mounting assembly 142. The user pivots the locking cover assembly 150 to the closed or locked position in which the locking cover assembly covers the slot. The biased locking mechanism, illustrated as tongue 185, automatically engages with the stop mechanism 154 to secure the reel axle 204 in the home position 156. The biased locking mechanism is locked when the locking cover assembly is shut without further human intervention.

The reel lift apparatus has a locking cover assembly 150 for securing the reel axle 204. The locking cover assembly 150 is pivotally mounted to the fixed mounting assembly 142 to allow the locking cover assembly 150 to open and close. A cover pivot mount 181 allows the locking cover assembly 150 to pivot relative to the axle slot assembly 130. In an open position, the slot opening 140 is accessible. The locking cover assembly 150 is mounted at an inset over the slot opening 140 at the proximal slot portion. As such, the axle slot 138 has a G-shape. In this configuration, the reel axle 204 rolls forward below the mounting assembly 142 as the arms 2, 8 are lifted up.

Figure 14:
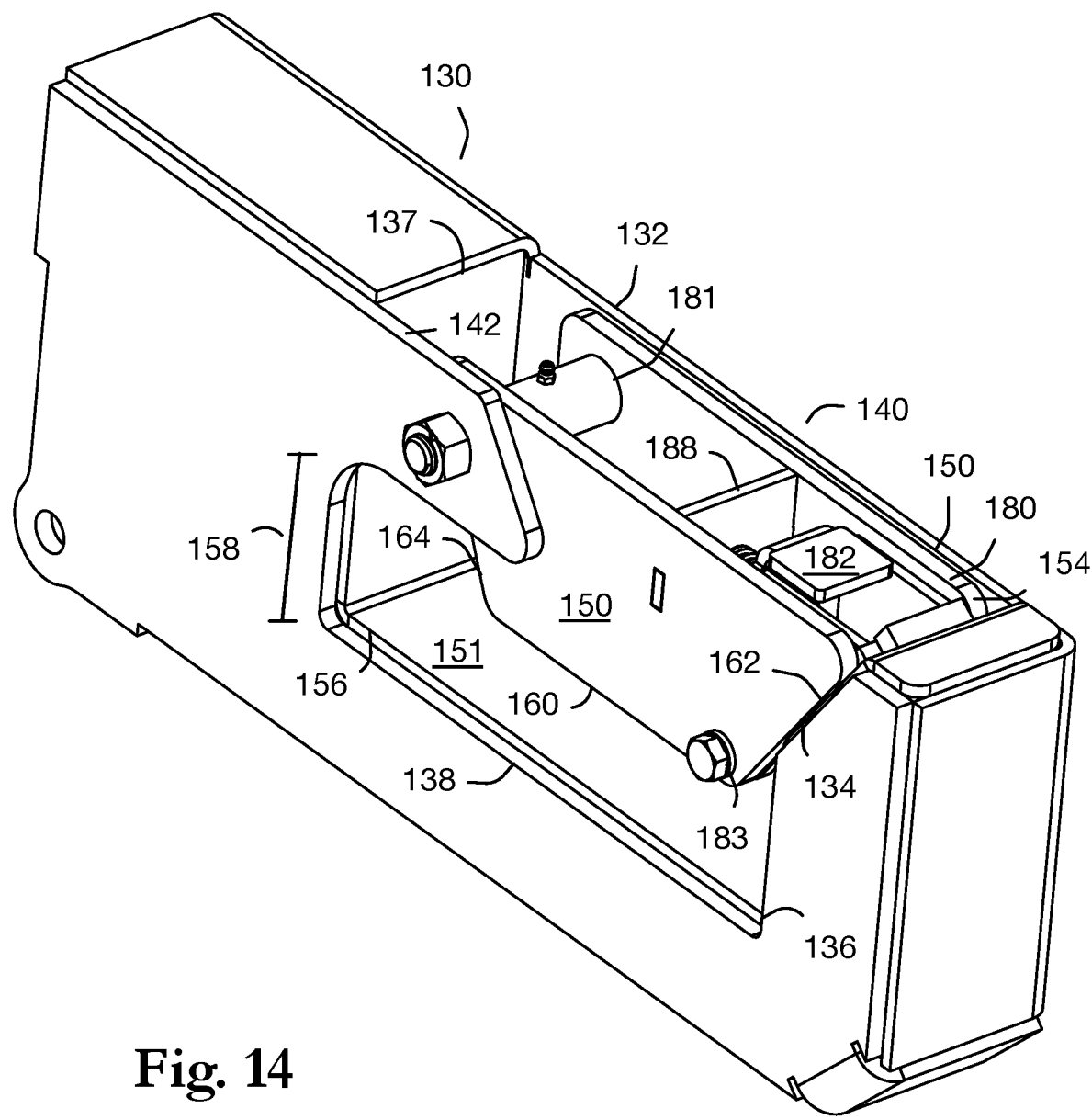
FIG. 14 depicts a top inside perspective view of an embodiment of the axle slot assembly with the locking cover assembly in the closed position.

As shown in FIG. 14, in the closed position, the axle slot assembly 130 is locked closed with a locking cover assembly 150. The locking cover assembly 150 has a biased locking mechanism 152 comprising a pawl 180, such as a pivoted tongue or sliding pin. The biased locking mechanism 152 is held in place with a lock biasing member 186, illustrated as a spring. Under force of the lock biasing member 186, the biased locking mechanism 152 is prevented from opening by engaging with a stop mechanism 191 located at the distal slot portion. The stop mechanism 191 may comprise a stop block that engages a pivoting tongue or a stop slot, such as an aperture, for receiving a sliding plunger pin 192. An opening lever 182 is provided to disengage the biased locking mechanism 152 with the stop mechanism 191. In one implementation, the lock biasing member 186 may be a spring that includes a coil that may be secured at one end to a spring back stop 188 and another end securing the pawl in the engaged position. The spring may be guided along a spring guide 187 to direct the biasing force. The biasing member may be different types of springs or other structures that provide biasing characteristics similar to a spring including, for example, a torsion spring, a twin spring, a compression coil spring, an extension spring, a flat spring, a barrel spring, or a wave spring.

The reel axle engagement jaw may have a one-hand opening lever 182. An easy to operate paddle lever 182 allows the locking cover assembly 150 to open to an open position to receive the reel axle 204. In one embodiment, the opening lever 182 is disposed toward the distal portion of locking cover assembly. In this configuration, the user can grasp the lever and lift the locking cover assembly with the mechanical advantage of the locking cover assembly as a mechanical lever. The lever 182 is mounted to biased locking mechanism 152 in such a way that pulling up on the lever causes the lever 182 and the biased locking mechanism 152 to pivot. Pivoting the biased locking mechanism 152 away from the stop mechanism 154 allows the locking cover assembly to rotate, and opens the slot 138. The biased locking mechanism and lever 182 are mounted to the locking cover assembly by a lock-lever pivot mount 183. A finger opening 184 allows the user to grip the lever 182 from below and pull the lever upwards and towards the first distal arm portion 4. Pulling on the lever 182 overcomes the biasing force of the lock biasing member 186. The lock biasing member 186 is compressed between the lever 182 and the spring back stop 188. The lock biasing member 186 is maintained in the proper orientation by the spring guide 187. The lock biasing member 186 maintains the biased locking mechanism in the outward, lockable position. As the locking cover assembly 150 is closed, the biased locking mechanism, illustrated as tongue 185, automatically engages the stop mechanism 154, illustrated as a stop block 191. In this way, the locking cover assembly 150 can be closed and locks automatically, without additional user involvement. The locking cover assembly may provide an audible click when secured. A grease point 189 is provided to maintain the smooth operation of the cover pivot mount 181.

In one embodiment, the locking cover assembly has a distal cover portion 162 that is sloped complementary to the distal end wall 134 at the distal end of the axle slot 138.

In one embodiment, the locking cover assembly 150 has a slide locking cover wall 164 that extends below the mounting assembly 142. In the locked configuration, the depth of the channel below the locking cover assembly 150 is shorter than the reel axle 204, this height is indicated by line 158. A downwardly extending portion 160 extends into the slot from the proximal slot portion at a height above the slot floor equal to the diameter of the reel axle 204. In this way, the proximal wall 164 of the downwardly extending portion 160 provides a distal wall for the reel axle 204 in the home position 156. The proximal slot wall provides a proximal wall for the reel axle 204 in the home position 156. This prohibits the reel axle 204 from rolling out of the home position 156 while the locking cover assembly 150 is secured. This also requires the user to lift the arms 2, 8 above an angle perpendicular to the ground before locking the locking cover assembly 150.

An advantage of the modular design is that the reel rotating mechanism does not need to be purchased with the hydraulic bed. The reel rotating mechanism can be offered as an add on kit. Even if the user does purchase a single reel rotating mechanism, the user may later discover that more traction is required for spooling larger reels or retrieving heavier material. The kit would be for rotating a reel having a reel axle supported by a lifting arm of a vehicle-mounted reel lifting apparatus. The kit may comprise: a rail configured to be mounted parallel to the lifting arm; a sleeve slidably mounted to the rail; a linear drive mechanism mounted to the rail and operably connected to the sleeve; a driven wheel mounted to the sleeve.

Hydraulic cylinders are mounted to the frame below the bed surface. The hydraulic cylinders are mounted to the cross-member with a variety of linkages 50. A control valve 352 can be mounted to a top body toolbox 350 mounted at the back corner of the bed 20. The control valve 352 can be fully proportional, giving the operator reliable, safe control of the reel, heavy materials or other equipment needed to be transported to and from the job site. Engine driven hydraulics are can be utilized to power the lift mechanism. Alternatively, electric driven hydraulic can be used to power the lift mechanism. Alternatively, power take off (PTO) driven hydraulic can be used to power the lift mechanism.

The motor 62 can be a hydraulic motor. A hydraulic motor can utilize the vehicle's hydraulics. A separate hydraulic circuit can be provided to control the motor 62. The hydraulic hoses can be secured to the rail 120 or the lifting arms 2, 8. The motor 62 is operationally coupled to the driven wheel 60. Alternatively, the motor 62 uses another power source, such as electric or pneumatic power.

In one embodiment, a reel lift apparatus is used for lifting, securing, transporting, and unrolling a cable reel, wire reel, or other similarly shaped equipment. The reel lift apparatus can be used with ¾ ton pickup trucks. The reel lift apparatus allows for multi-purpose trucks to be outfitted for hauling a cable reel on the bed of truck, without the need for a separate trailer. The bed is designed to carry reels over the truck axle for maximum stability.

In one embodiment, the reel lift apparatus has a bed with arms that are pivotally mounted to the bed. The arms are configured to be pivoted such that the ends of the arms are lowered to engage the reel axle. To load the reel, the arms pivot up and toward the truck.

In one embodiment, the arms have an axle slot for receiving the reel axles. A reel axle engagement jaw opens and closes to lock the reel axle within the axle slot. A simple lever open mechanism allows for one-handed operation of the reel axle engagement jaw.

In an embodiment having lifting arms 2, 8 that are reversibly mountable to the solid exterior wall 132 is mountable to either side of the axle slot assembly 130. In this way, the solid exterior wall 132 is mountable to the exterior side of the axle slot assembly 130 regardless of whether the respective lifting arm 2, 8 is mounted at the first peripheral end of the cross member 16 or the second peripheral end of the cross member. The solid exterior wall 132 is mounted to the exterior surface in order to prevent the reel axle 204 from lateral movement. In an alternative embodiment, a flange is mounted on the axle itself to prevent lateral movement. The flange cooperates with the axle slot assembly 130 to prevent lateral movement of the axle.

Figure 18:
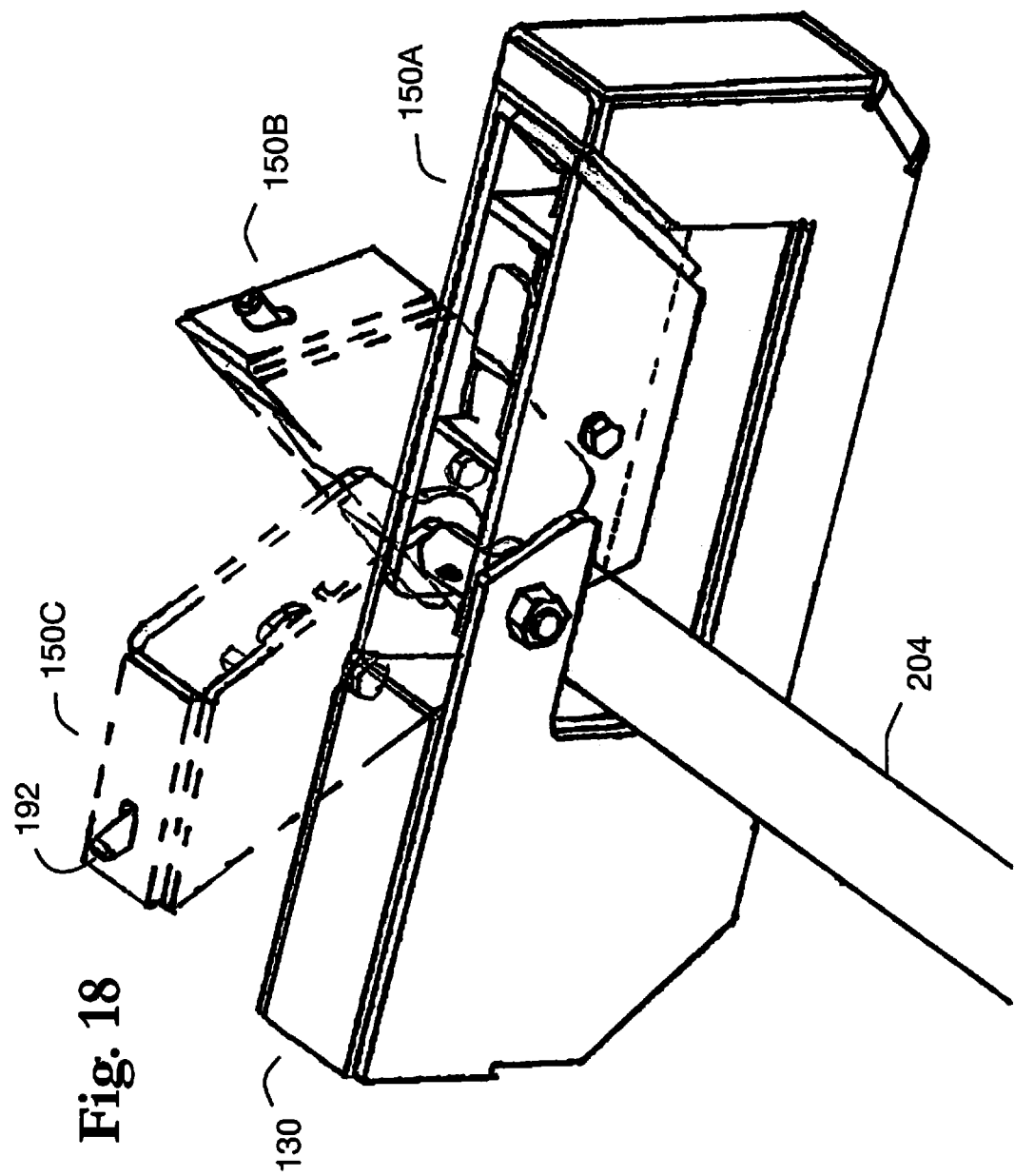
FIG. 18 depicts a top side perspective view of an embodiment of the axle slot assembly with the motion of the axle slot assembly shown in dashed lines, showing a closed, partially opened, and fully opened locking cover assembly.

The advantages of the reel lift apparatus may include:
a. The reel lift apparatus having fixed arm width with non-pivotable arms, the arms are inset from the total bed width to allow tool boxes to be mounted to the outside edges of the bed;
b. The reel lift apparatus having fixed arm width with non-pivotable arms with a cross-tube that is flush with the truck bed when the arms are in the retracted position;
c. The reel lift apparatus arms rest flat on the surface of the bed in the retracted position
d. The reel lift apparatus having fixed arm width with non-pivotable arms with a hydraulic cylinder and piston that are below the bed in the extended and retracted position;
e. The locking reel axle engagement jaw has a biased pawl (tongue or plunger pin) that engages with a stop block in the closed position, with a pivoting lever to open jaw;
f. The locking reel axle engagement jaw has a G-shaped slot, where the reel axle rolls under force of gravity to a home position in the slot as the arms are raised;
g. The reel axle remains in the home position between (1) the arms are positioned above perpendicular to the ground and (2) the arms are positioned where the reel is loaded and resting on the bed;
h. The reel axle engagement jaw has a slot that has a distal end wall that is inwardly and downwardly sloped;
i. The wide slot opening provides easier axle engagement and upward lift allows simple lifting of reels on uneven ground;
j. An instantly contained channel design utilizes the weight of the reel to instantly contain the axle to the home position;
k. A spring-loaded latch plunger pin, which may be made of stainless steel to prevent corrosion, secures the locking cover assembly;
l. One-handed opening is achieved with an easy, comfortable paddle lever;
m. The latch that secures the locking cover assembly is a positive close latch that securely locks the locking cover assembly in place without further operator interaction;
n. In the open position, the locking cover assembly provides a backstop when loading the reel to direct the axle into the slot, allowing the operator to back up the vehicle until the reel axle contacts the locking cover assembly;
o. In the open position, the lock cover assembly has a downwardly sloping distal portion as shown in FIG. 18, which directs the reel axle into the slot as the lifting arms 2, 8 are lifted;
p. The reel rotation mechanism is capable of dispensing the reelable material 206 with the lifting arms 2, 8 in an extended position behind the bed 20 such that the reelable material 206 is vertically straight as it comes off the reel 200;
q. The reel rotation mechanism is capable of dispensing the reelable material 206 with the lifting arms 2, 8 in an extended position behind the bed 20 such that the reel 200 is positioned above a hole 300 or over a ledge.

In one embodiment, the reel lift apparatus has generally U-shaped arms that pivot relative to the bed. The U-shaped arms have a cross-tube that extends across the lateral width of the arms, forming the base of the U-shaped arms. The arms have a first arm portion and a second arm portion that extend away from the cross-tube. Each arm portion has a distal end and a proximal end. In the extended position, the cross-tube is higher than the arm portions. In the retracted position, the cross-tube is mounted flush with the bed. The arm portions lay on top of the bed. The width of the arm portions can be fixed the same as the width of the cross-tube. In this embodiment, the arms are fixed at an angle perpendicular to the cross-tube and do not pivot. In one embodiment, the cross-arms are fixed a width more narrow than the bed. This configuration allows tool boxes to be mounted to the outside portions of the along the length of the bed.

In one embodiment, hydraulic cylinders are mounted to the frame below the bed surface. The hydraulic cylinders are mounted to the arm with a variety of linkages 50. A control valve can be mounted to a top body toolbox mounted at the back corner of the bed. The valve is fully proportional and direct acting, giving the operator reliable, safe control of the reel, heavy materials or other equipment needed to be transported to and from the job site. Engine driven hydraulics are can be utilized to power the lift mechanism. Alternatively, electric driven hydraulic can be used to power the lift mechanism. Alternatively, power take off (PTO) driven hydraulic can be used to power the lift mechanism.

In one embodiment, the driven wheel 60 rotates the reel 200 by contact with the reel rim 202 by moving radially with respect to the reel 200. The movement can be in an axis parallel to the lifting arms 2, 8, as illustrated. Alternatively, the movement of the driven wheel 60 can be in an alternative radial axis. For example, the rail support 124 can be taller than the distal rail mount 121 and maintain the rail 120 in a radial axis of the reel 200. The driven wheel 60 then enters and exits the circumference of the wheel in any pivot position of the arm, because the axis of movement is in a radial axis. The radial axis of the reel 200 moves with the reel 200 as the lifting arms 2, 8 pivot through the plurality of pivot points. In the extended position, shown in FIG. 19, the rail 120 moves with the lifting arm 2, 8, thereby maintaining the movement of the driven wheel 60 in the radial axis.

In one embodiment, the vehicle-mounted reel lifting apparatus for lifting a reel comprises a means for moving the driven wheel 60 into contact with the rim 202 and the means for moving the driven wheel 60 is directly mounted to the first lifting arm 2 and pivots with the first lifting arm 2.

In one embodiment, the driven wheel 60 can be configured to slide in an axis generally parallel to a radius of the circular rim 202 of the reel in the plurality of pivot positions of the lifting arm 2, 8. For clarity, a radial axis is an axis oriented with a radius of the rim 202 of the reel 200. In one embodiment, the driven wheel 60 is configured to move in a straight line or a curved line of movement in which the driven wheel is capable of entering the circumference of a larger reel and a smaller reel in any of the pivot positions of the lifting arm 2, 8.

Figure 19:
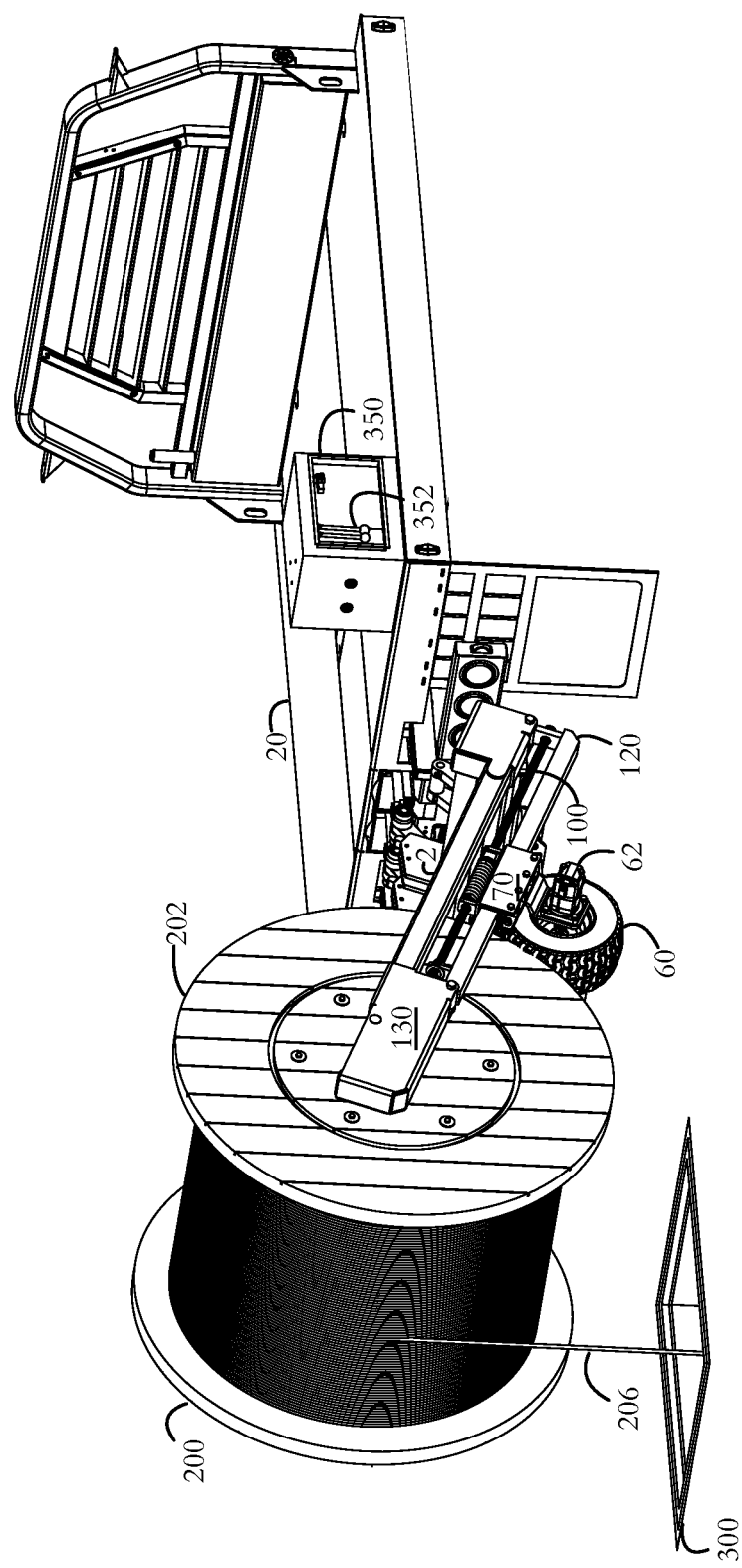
FIG. 19 depicts a rear side perspective view of the lifting arms in an extended position with the reel capable of rotating directly over a hole in the ground.

In one embodiment, the reelable material 206 is dispensed or retrieved vertically straight from the reel 200, which is illustrated in FIG. 19. The lifting arms 2, 8 are in an extended position with the reel 200 behind the bed 20. The reel rotation mechanism is capable of contacting the rim of the reel 200 in this orientation. The driven wheel 60 travels along the rail 120 to engage the rim 202 of the reel 200. As the reel 200 rotates, the reelable material 206 is dispensed or retrieved vertically straight as it comes off the reel 200. In this way, the reel 200 can be positioned directly over a hole 300 or over a ledge and the reel rotation mechanism is capable of engaging the rim 202. The free reelable material comes off in an axis that is a tangent to the circumference of the portion of the reelable material on the reel 200.

In one embodiment, the locking cover assembly 150 pivots on a cover pivot mount 181 through an open configuration, an intermediary configuration, and a locked configuration, as shown in FIG. 18. In the locked configuration, the locking cover assembly 150 covers the slot opening 140 and prevents the reel axle 204 from exiting the slot 138. In the intermediary configuration, the locking cover assembly 150 is raised from the locked configuration to a point where the angle between the top of the locking cover assembly 150 is less than perpendicular with the longitudinal axis of the lifting arm 2, 8. The operator can release the locking cover assembly 150 from the intermediary configuration, allowing the locking cover assembly to rotate under the force of gravity. The locking cover assembly pivots shut under the force of gravity to the locked configuration, where the biased locking mechanism 152 is held in place with the engagement between the lock biasing member 186 and the stop mechanism 191. In the open configuration, the locking cover assembly 150 has a top portion that rests against the proximal slot wall 137 of the axle slot assembly 130 and downwardly extending portion 160 that is downwardly slanted toward the slot opening 140. To load the reel 200, the operator extends each of the lifting arms 2, 8 behind the vehicle and places each of the locking cover assemblies into the open configuration. As the operator reverses the vehicle to position the slot opening 140 under the reel axle 204, the locking cover assembly 150 in the open configuration acts as a backstop for the reel axle 204. The operator backs up until the reel axle 204 is above the slot opening 140 or until each end of the reel axle 204 has made contact with the respective locking cover assembly 150. Then the operator lifts the lifting arms 2, 8. Once the lifting arms 2, 8 are raised above an angle parallel with the ground level, the reel axle 204 slides forward into the home position 156. The locking cover assembly 150 in the open configuration directs the reel axle 204 into the slot opening 140. The operator then pushes the locking cover assembly 150 so that the locking cover assembly 150 closes under the force of gravity, with the biased locking mechanism automatically securing the locking cover assembly 150 in the locked position.

In one embodiment, the locking mechanism provides an audible click to indicate to the user that the locking mechanism is properly engaged with the stop mechanism.

In one embodiment, a drop hitch 24 with a Category 5 receiver tube as well as a 30,000 lb. rated gooseneck ball recessed is engineered into the bed beneath the deck. An optional tool circuit is also available to run hydraulic tools requiring between 5 gallons per minute (GPM) and 11 GPM of flow and up to 2,200 pounds per square inch (psi).

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

The invention claimed is:
1. A vehicle-mounted reel lifting apparatus for rotating a reel having a circular rim, the vehicle-mounted reel lifting apparatus comprising:
 a. A first lifting arm pivotally mounted to a vehicle and configured to pivotally move the reel through a plurality of pivot positions; and
 b. A driven wheel attached to the first lifting arm to pivot with the first lifting arm, the driven wheel configured to contact the circular rim by moving in an axis parallel to a radius of the circular rim.

2. The vehicle-mounted reel lifting apparatus of claim 1, the vehicle-mounted reel lifting apparatus further comprising:
 a. A first rail mounted to the first lifting arm parallel to a radius of the circular rim;
 b. A sleeve slidably mounted to the first rail; and
 c. Wherein the driven wheel is mounted to the sleeve.

3. The vehicle-mounted reel lifting apparatus of claim 2, the vehicle-mounted reel lifting apparatus further comprising:
 a. A linear drive mechanism configured to move the sleeve along the first rail.

4. The vehicle-mounted reel lifting apparatus of claim 3, the vehicle-mounted reel lifting apparatus further comprising:
 a. A spring compression mount operably connected between the sleeve and the linear drive mechanism; and
 b. Wherein the linear drive mechanism is configured to cause the spring compression mount to generate a traction force between the driven wheel and the circular rim when the driven wheel contacts the circular rim.

5. The vehicle-mounted reel lifting apparatus of claim 4, wherein the spring compression mount is configured to travel with the sleeve until the driven wheel contacts the circular rim.

6. The vehicle-mounted reel lifting apparatus of claim 1, the vehicle-mounted reel lifting apparatus further comprising:
 a. A linear drive mechanism extending along a length of and parallel to a longitudinal axis of the first lifting arm, the linear drive mechanism configured to move the driven wheel into contact with the circular rim.

7. The vehicle-mounted reel lifting apparatus of claim 6, the vehicle-mounted reel lifting apparatus further comprising:
 a. A first rail mounted parallel to the first lifting arm and the linear drive mechanism;
 b. A sleeve slidably mounted to the first rail;
 c. Wherein the driven wheel is mounted to the sleeve; and
 d. Wherein the linear drive mechanism is operably connected to the sleeve.

8. The vehicle-mounted reel lifting apparatus of claim 7, the vehicle-mounted reel lifting apparatus further comprising:
 a. A spring compression mount operably connected to the sleeve and the linear drive mechanism; and
 b. wherein the spring compression mount is configured to maintain traction between the driven wheel and a reel.

9. A vehicle-mounted reel lifting apparatus for reels having a reel axle, the vehicle-mounted reel lifting apparatus comprising:
 a. A lifting arm pivotally mounted to the vehicle and having:
  i. a distal arm portion that is distal to the vehicle;
 b. An axle slot assembly mounted at the distal arm portion, the axle slot assembly having:
  i. A slot comprising:
   1. a proximal slot portion that is proximal to the lifting arm;
   2. a distal slot portion that is distal to the lifting arm;
   3. A stop mechanism disposed at the distal slot portion;
  ii. A locking cover assembly pivotally mounted to the proximal slot portion, the locking cover assembly comprising:
   1. A biased locking mechanism mounted to the locking cover assembly; and
  iii. Wherein the biased locking mechanism is configured to automatically engage the stop mechanism to prevent the locking cover assembly from pivoting open.

10. The vehicle-mounted reel lifting apparatus of claim 9 wherein:
 a. The biased locking mechanism further comprises:
  i. A tongue that extends by pivoting toward the distal slot portion; and
 b. Wherein the stop mechanism is a stop block.

11. The vehicle-mounted reel lifting apparatus of claim 9 wherein:
 a. The biased locking mechanism further comprises:
  i. A plunger pin that extends toward the distal slot portion of the axle slot assembly; and
 b. Wherein the stop mechanism is a stop slot.

12. The vehicle-mounted reel lifting apparatus of claim 9 wherein:
 a. The slot further comprises:
  i. a distal end wall downwardly sloped toward the slot; and
 b. The locking cover assembly further comprises:
  i. a distal cover portion that is sloped complementary to the distal end wall of the slot.

13. The vehicle-mounted reel lifting apparatus of claim 9 wherein the axle slot assembly further comprises:
 a. an exterior wall mounted to an exterior of the slot and configured to prevent the reel axle from lateral movement.

14. A reel lifting apparatus for mounting on a vehicle for lifting a reel having a circular rim, the reel lifting apparatus comprising:
 a. A first lifting arm configured to be pivotally mounted to the vehicle and to receive the reel;
 b. A driven wheel;
 c. Means for moving the driven wheel into contact with the circular rim; and
 d. Wherein the means for moving the driven wheel is directly mounted to the first lifting arm and pivots with the first lifting arm.

15. The reel lifting apparatus of claim 14 further comprising:
 a. A first rail mounted to the first lifting arm parallel to a radius of the circular rim; and
 b. Wherein the driven wheel is slidably mounted to the first rail.

16. The reel lifting apparatus of claim 14 further comprising:
 a. A locking cover assembly pivotally mounted to first lifting arm, the locking cover assembly configured to pivot between an open position and a closed position; and
 b. Means for automatically securing the locking cover assembly in the closed position upon the locking cover assembly pivoting closed under the force of gravity.

* * * * *